US012577441B2

(12) United States Patent
Watanabe et al.

(10) Patent No.: US 12,577,441 B2
(45) Date of Patent: Mar. 17, 2026

(54) PRESSURE-SENSITIVE ADHESIVE TAPE

(71) Applicant: DIC Corporation, Tokyo (JP)

(72) Inventors: Daisuke Watanabe, Saitama (JP); Kota Suetsugu, Saitama (JP); Akira Yamakami, Saitama (JP); Yumi Kagiyama, Saitama (JP)

(73) Assignee: DIC Corporation, Tokyo (JP)

( * ) Notice: Subject to any disclaimer, the term of this patent is extended or adjusted under 35 U.S.C. 154(b) by 163 days.

(21) Appl. No.: 17/869,168

(22) Filed: Jul. 20, 2022

(65) Prior Publication Data

US 2022/0380640 A1 Dec. 1, 2022

Related U.S. Application Data

(63) Continuation of application No. PCT/JP2021/000942, filed on Jan. 14, 2021.

(30) Foreign Application Priority Data

Jan. 21, 2020 (JP) ................................. 2020-007906

(51) Int. Cl.

| | |
|---|---|
| ***C09J 11/08*** | (2006.01) |
| ***C09J 7/38*** | (2018.01) |
| ***C09J 153/02*** | (2006.01) |

(52) U.S. Cl.

CPC ................. *C09J 11/08* (2013.01); *C09J 7/38* (2018.01); *C09J 153/02* (2013.01); *C09J 2301/302* (2020.08); *C09J 2301/408* (2020.08); *C09J 2301/414* (2020.08)

(58) Field of Classification Search

None

See application file for complete search history.

(56) References Cited

FOREIGN PATENT DOCUMENTS

| | | | | | |
|---|---|---|---|---|---|
| CN | 103459537 | B | * | 9/2015 | ............ C09J 133/08 |
| JP | 2015-124289 | A | | 7/2015 | |
| JP | 2016-26255 | A | | 2/2016 | |
| JP | 2019006907 | A | * | 1/2017 | |
| JP | 2017-171772 | A | | 9/2017 | |
| JP | 2019-85587 | A | | 6/2019 | |
| WO | 2007/029783 | A1 | | 3/2007 | |
| WO | WO-2017168869 | A1 | * | 10/2017 | ............ B32B 27/00 |
| WO | 2019/003933 | A1 | | 1/2019 | |
| WO | 2019/167922 | A1 | | 9/2019 | |

OTHER PUBLICATIONS

Suzuki et al., WO-2017168869-A1, Oct. 5, 2017 (machine translation) (Year: 2017).*

Akira et al., CN-103459537-B, Sep. 30, 2015 (machine translation) (Year: 2015).*

Watanabe et al., JP-2019006907-A, Jan. 17, 2019 (machine translation) (Year: 2019).*

* cited by examiner

*Primary Examiner* — Cheng Yuan Huang

(74) *Attorney, Agent, or Firm* — Osha Bergman Watanabe & Burton LLP

(57) ABSTRACT

An adhesive tape with high repeelability from the state that a portion of the adhesive tape has already been peeled from an adherend is provided. The adhesive tape includes a substrate layer and an adhesive layer. The substrate layer has a breaking stress in a range of 1 to 90 MPa and an elongation at break in a range of 400% to 3000%. The adhesive tape satisfies the following relational expression (i): [Math. 1] $P_{400}/P_0 \leq 0.9$ (i). $P_0$ denotes an initial cleavage strength N/cm$^2$ of the adhesive tape, and $P_{400}$ denotes a cleavage strength N/cm$^2$ when the adhesive tape is stretched by 400%.

6 Claims, No Drawings

PRESSURE-SENSITIVE ADHESIVE TAPE

TECHNICAL FIELD

One or more embodiments of the present invention relate to an adhesive tape.

BACKGROUND

Adhesive tapes have high workability and adhesion reliability. Thus, adhesive tapes are widely used as bonding means for fixing components constituting relatively large electronic equipment, such as flat-screen televisions, home appliances, and OA equipment, or relatively small electronic equipment, such as mobile electronic terminals, cameras, and personal computers. More specifically, in various industrial sectors of OA equipment, IT products and home appliances, automobiles, and the like, adhesive tapes are used not only for component fixing applications, such as fixing between sheet metals or between exterior components and housings, which constitute large electronic equipment, and fixing exterior components or rigid components, such as batteries, to small electronic equipment, and for temporary fixing applications of these components, but also for labeling applications for displaying product information.

In recent years, for the purpose of resource conservation from the perspective of global environmental protection, in these industrial sectors, there has been an increasing tendency to disassemble used products and recycle or reuse recyclable or reusable components used in the products. In such a case, when an adhesive tape is used, the adhesive tape must be peeled from a component. However, an adhesive tape typically has high adhesive strength and is adhered to many portions of a product; therefore the operation of peeling an adhesive tape requires considerable labor. Thus, there is a need for an adhesive tape that can be relatively easily peeled off and removed for recycling or reuse.

A technology relating to an adhesive tape that can be easily peeled off and removed is described in Patent Literature 1, for example. Patent Literature 1 discloses an adhesive tape that has an adhesive portion and a tab portion and that can be peeled from an adherend stuck on both surfaces of the adhesive portion by grasping and stretching the tab portion in a direction approximately parallel to the bonding surface. In small electronic equipment, however, due to a narrow space between members in the electronic equipment, it is difficult to stretch and peel an adhesive tape adhered in the space in a direction parallel to the bonding surface. Patent Literature 2 discloses an adhesive tape that can be removed again by stretching the adhesive tape at 30 degrees with respect to the bonding surface.

PATENT LITERATURE

PTL 1: Japanese Unexamined Patent Application Publication No. 2015-124289

PTL 2: Japanese Unexamined Patent Application Publication No. 2016-26255

In the technique of Patent Literature 1, although the holding power of an adhesion tape cured in an oven at 40° C. for 30 minutes and then suspended with a 1-kg weight is evaluated, repeelability is not examined. On the other hand, in the technique of Patent Literature 2, an adhesive article that can be stretched and removed without breakage and without leaving an adhesive residue is studied. However, Patent Literature 2 does not describe the repeelability of an adhesive tape a portion of which is peeled from an adherend. In general, when an adhesive tape is re-peeled in the 90-degree direction while being stretched from an adherend, the adhesive tape is peeled off while touching the adherend. Thus, once peeling is stopped in a re-peeling step, a known adhesive tape thus peeled adheres again to the adherend. The tape cannot be re-peeled due to the breakage of the tape or residual adhesive while re-peeling.

Accordingly, one or more embodiments of the present invention provide an adhesive tape with high repeelability from the state that a portion of the adhesive tape has already been peeled from an adherend.

SUMMARY

As a result of extensive studies, the present inventor has completed one or more embodiments of the present invention by finding that there is a specific relationship between the initial cleavage strength of an adhesive tape and the cleavage strength when the adhesive tape is stretched by a predetermined ratio.

Thus, one or more embodiments of the present invention are as follows:

[1] One or more embodiments of the present invention provide an adhesive tape including a substrate layer and an adhesive layer, wherein the substrate layer has a breaking stress in the range of 1 to 100 MPa and an elongation at break in the range of 400% to 3000%, and the following relational expression (i) is satisfied:

[Math. 1]

$$P_{400}/P_0 \leq 0.9 \quad \text{(i)}$$

wherein $P_0$ denotes the initial cleavage strength (N/cm$^2$) of the adhesive tape, and $P_{400}$ denotes a cleavage strength (N/cm$^2$) when the adhesive tape is stretched by 400%.

[2] In one or more embodiments of the present invention, the adhesive layer may have a storage modulus G' (23° C.) in the range of $1.0\times10^5$ to $1.0\times10^7$ Pa.

[3] In one or more embodiments of the present invention, the adhesive layer may contain filler.

[4] In one or more embodiments of the present invention, the adhesive layer may contain a styrene block copolymer.

[5] In one or more embodiments of the present invention, the adhesive layer may contain a triblock copolymer with a repeating unit represented by

[Chem. 1]

$$*-(A)_p-(B)_q-(C)_r-* \quad (1)$$

wherein A, B, and C independently denote a repeating unit,

A and C independently denote an alkyl methacrylate monomer unit,

B denotes an alkyl acrylate monomer unit, p, q, and r independently denote the degree of polymerization of their respective monomer units, A and C may be the same or may denote an alkyl methacrylate monomer unit with a different chemical structure, and * denotes a bonding arm to another atom.

[6] In one or more embodiments of the present invention, the filler may be a silicone resin.

[7] In one or more embodiments of the present invention, the adhesive layer may further contain a tackifier resin.

One or more embodiments of the present invention can provide an adhesive tape with high repeelability from the state that a portion of the adhesive tape has already been peeled from an adherend.

DETAILED DESCRIPTION

One or more embodiments of the present invention (hereinafter referred to as "the present disclosure") are described in detail below, but the present invention is not limited to the embodiments described below.

(Adhesive Tape)

An adhesive tape according to the present disclosure is an adhesive tape with a substrate layer and an adhesive layer. The substrate layer has a breaking stress in the range of 1 to 100 MPa. The adhesive tape according to the present disclosure satisfies the following relational expression (i):

[Math. 2]

$$P_{400}/P_0 \leq 0.9 \quad \text{(i)}$$

wherein $P_0$ denotes an initial cleavage strength (N/cm$^2$) of the adhesive tape, and $P_{400}$ denotes a cleavage strength (N/cm$^2$) when the adhesive tape is stretched by 400%.

With such a structure, the adhesive tape according to the present disclosure can have high repeelability from the state that a portion of the adhesive tape has already been peeled from an adherend.

More specifically, the substrate layer of the adhesive tape according to the present disclosure has a breaking stress in the range of 1 to 100 MPa and an elongation at break in the range of 400% to 3000%. An operator can therefore pull the adhesive tape with a relatively light force at an early stage of peeling the adhesive tape from an adherend (at an early stage of stretching the adhesive tape) and can peel (re-peel) the adhesive tape from the adherend without breakage through a peeling operation even when pulling the adhesive tape at a relatively high speed.

Furthermore, satisfying the relational expression (i), the adhesive tape according to the present disclosure can have high repeelability from the state that a portion of the adhesive tape has already been peeled from an adherend.

The initial cleavage strength $P_0$ (N/cm$^2$) of the adhesive tape in the relational expression (i) refers to the strength at which an adherend peels off when the adhesive tape in a normal state is attached to the adherend and is then pulled under predetermined conditions. In the present description, the initial cleavage strength $P_0$ (N/cm$^2$) was calculated under the following evaluation conditions by the following evaluation method.

For convenience of evaluation, an adhesive tape with an adhesive layer and a release liner on both surfaces of a substrate layer was used as a test specimen. More specifically, the adhesive tape cut into 30 mm×50 mm was used as a test specimen. The release liner on one surface of the test specimen was peeled off, and the surface was attached to a stainless steel (SUS) plate 3 mm in thickness. The release liner on the other surface was peeled off, and the surface was attached to a 10-mm square surface of a test specimen 10 mm×10 mm×40 mm in length. They were pressure-bonded at 50 N/cm$^2$ for 10 seconds to prepare a bonded material. Immediately after the bonded material was attached in an atmosphere of 23° C. and 50% RH, the stainless steel piece of the test specimen constituting the bonded material was pulled at a speed of 1000 mm/min in an atmosphere of 23° C. and 50% RH. The strength at which the stainless steel piece peeled off was defined as the initial cleavage strength $P_0$.

In one or more embodiments of the present invention, the initial cleavage strength $P_0$ (N/cm$^2$) of the adhesive tape preferably ranges from 0.1 to 200 N/cm$^2$, more preferably 1 to 150 N/cm$^2$, still more preferably 50 to 130 N/cm$^2$. At a cleavage strength $P_0$ in the range of 0.1 to 200 N/cm$^2$, both adhesiveness and disassemblability can be easily satisfied.

The adhesion at 400% elongation $P_{400}$ (N/cm$^2$) in the relational expression (i) refers to the strength at which an adherend peels off when the adhesive tape stretched by 400% is attached to the adherend and is then pulled under predetermined conditions. In the present description, the adhesion at 400% elongation $P_{400}$ (N/cm$^2$) was calculated under the following evaluation conditions by the following evaluation method.

For convenience of evaluation, an adhesive tape with an adhesive layer and a release liner on both surfaces of a substrate layer was used as a test specimen. More specifically, the adhesive tape cut into 30 mm×50 mm was used as a test specimen. The release liner on both surfaces of the test specimen was peeled off, and a grip was formed at each end of the test specimen. A strong adhesive double-sided tape for fixing a stretched tape was attached to the surface of a stainless steel plate 2 mm in thickness. The test specimen was stretched by 400% and was attached to the double-sided adhesive tape on the surface of the stainless steel plate. A 10-mm square surface of a test specimen 10 mm×10 mm×40 mm in length was attached to the other surface. They were pressure-bonded at 50 N/cm$^2$ for 10 seconds to prepare a bonded material. Immediately after the bonded material was attached in an atmosphere of 23° C. and 50% RH, the stainless steel piece of the test specimen constituting the bonded material was pulled at a speed of 1000 mm/min in an atmosphere of 23° C. and 50% RH. The strength at which the stainless steel piece peeled off was defined as the adhesion at 400% elongation $P_{400}$.

An adhesive tape according to one or more embodiments of the present invention is not limited to a double-sided tape essentially having an adhesive layer on both surfaces of the substrate layer or a (double-sided) tape essentially having a release liner on both surfaces of the substrate layer and only needs to have an adhesive layer on at least one surface of the substrate layer. Furthermore, in a method for producing a double-sided tape that satisfies the relational expression between the cleavage strength $P_0$ (N/cm$^2$) and the cleavage strength $P_{400}$ (N/cm$^2$) and that includes an adhesive layer and/or a release liner on both surfaces of a substrate layer, the step of providing the adhesive layer on both surfaces of the substrate layer may be appropriately changed to the step of providing the adhesive layer only on one surface of the substrate layer. Furthermore, the initial cleavage strength and the adhesion at 400% elongation are not related to the structure with the adhesive layer on both surfaces of the substrate layer but depend mainly on the characteristics of the adhesive layer and the adhesive strength between the adhesive layer and the substrate layer. Thus, it goes without saying that the relational expression (i) and the evaluation method, which are characteristics of the double-sided tape, can be applied to a single-sided tape.

In one or more embodiments of the present invention, the adhesion at 400% elongation $P_{400}$ (N/cm$^2$) preferably ranges from 0.001 to 70 N/cm$^2$, more preferably 0.1 to 40 N/cm$^2$, still more preferably 1 to 30 N/cm$^2$. At an adhesion $P_{400}$ in the range of 0.001 to 70 N/cm$^2$, both repeelability and adhesiveness can be easily satisfied.

$P_{400}/P_0$ in the relational expression (i) is 0.9 or less, preferably 0.001 to 0.7, more preferably 0.01 to 0.6, still more preferably 0.01 to 0.3. When the relational expression (i) is 0.9 or less, this results in a better effect on repeelability from the state that a portion of the adhesive tape has already been peeled from an adherend.

In the adhesive tape according to the present disclosure, satisfying at least one of the following requirements (a) to (f) tends to satisfy the condition of the relational expression (i).

(a) The adhesive layer has a storage modulus G' (23° C.) in the range of $1.0\times10^5$ to $1.0\times10^7$ Pa.

(b) A filler is added to the adhesive layer.

(c) The adhesive layer is an adhesive agent containing a styrene block copolymer.

(d) The adhesive layer is an adhesive agent containing an acrylic block copolymer.

(e) The filler in the adhesive layer is a silicone filler.

(f) The adhesive layer contains a tackifier resin.

Satisfying (a), (c), (d), or (f) results in the adhesive layer with low restoring force after the adhesive tape is pulled, and difficulty in restoring the adhesive tape stretched by 400% to its normal state, and can therefore decrease the adhesion $P_{400}$. Furthermore, the high-load holding power is easily satisfied. Satisfying (b) results in the filler exposed on the surface of the adhesive layer when the adhesive tape is pulled, and can therefore decrease the adhesion $P_{400}$ in the relational expression (i). In particular, a combination with the requirement (a), (c), (d), or (f) can maintain the filler exposed on the surface of the adhesive layer for extended periods and therefore produce a synergistic effect. Satisfying (e) can effectively prevent re-adhesion to an adherend, impart lubricity to the adhesive layer while re-peeling, and improve repeelability.

The reason why satisfying the relational expression (i) improves "repeelability from the state that a portion of the adhesive tape has already been peeled from an adherend" is intricately related to the requirements (a) to (f), and the details of the mechanism are unknown. However, the details of the mechanism are presently considered as follows.

Stretching the adhesive tape protrudes the filler in the adhesive agent from the surface of the adhesive agent and thereby decreases adhesiveness. Furthermore, the use of an elastic adhesive agent can maintain the state for extended periods. Furthermore, the use of a filler with high lubricity, such as a silicone filler, makes stretching easier. For these reasons, the adhesive tape can have high repeelability from the state that a portion of the adhesive tape has already been peeled from an adherend.

An adhesive tape according to one or more embodiments of the present invention has an adhesive layer in contact with at least one surface of a substrate layer. An adhesive tape according to one or more embodiments of the present invention may have two adhesive layers in contact with both surfaces of a substrate layer, if necessary, and the two adhesive layers may be the same or different. An adhesive tape according to one or more embodiments of the present invention is not only a general term of a rolled adhesive tape with an adhesive layer on one or both surfaces of a substrate layer but also a sheet-like adhesive tape with an adhesive layer on one or both surfaces of a substrate layer and with a release liner.

A substrate layer and an adhesive layer constituting an adhesive tape according to one or more embodiments of the present invention are described in detail below.

"Substrate Layer"

In the present disclosure, the adhesive tape includes at least one adhesive layer and a substrate layer in contact with the adhesive layer. The substrate layer has a breaking stress in the range of 1 to 100 MPa and an elongation at break in the range of 400% to 3000%.

In the present disclosure, the substrate layer may be any substrate layer with the characteristics described above, can be appropriately selected from known materials that can be used for adhesive tapes, may contain the following substrate material, and may further contain another optional component. The substrate layer may have a monolayer structure or a multilayer structure of two or three or more layers.

In the present disclosure, the substrate layer has a breaking stress in the range of 1 to 100 MPa, preferably 10 to 90 MPa, more preferably 15 to 90 MPa, still more preferably 30 to 90 MPa, still more preferably 50 to 90 MPa. When the breaking stress is 1 MPa or more, an operator can pull and peel the adhesive tape from an adherend without breakage. When the breaking stress is 90 MPa or less, an operator can pull the adhesive tape without excessive stress.

The breaking stress of the substrate layer is measured by punching the substrate layer into a dumbbell with a gauge length of 20 mm and a width of 5 mm, pulling the substrate layer in a measurement atmosphere of 23° C. and 50% RH using a Tensilon tensile tester (model: RTF-1210, manufactured by A&D Company, Limited) at a crosshead speed of 500 mm/min in the longitudinal direction, and measuring the stress at break.

The breaking stress can be adjusted by appropriately selecting a material and stretching the material in the step of producing the substrate layer.

In the present disclosure, the substrate layer has an elongation at break in the range of 400% to 3000%, preferably 500% to 2500%, more preferably 530% to 1700%, still more preferably 560% to 1300%, still more preferably 600% to 1200%. When the elongation at break is 400% or more, peeling stress is not excessive even when the adhesive tape adheres strongly to an adherend. When the elongation at break is 3000% or less, the adhesive tape can be peeled off in a small space without a too long stretching distance.

The elongation at break of the substrate layer is measured by punching the substrate layer into a dumbbell with a gauge length of 20 mm and a width of 5 mm, pulling the substrate layer in a measurement atmosphere of 23° C. and 50% RH using a Tensilon tensile tester (model: RTF-1210, manufactured by A&D Company, Limited) at a crosshead speed of 500 mm/min in the longitudinal direction, and measuring the tensile elongation percentage at break.

The elongation at break can be adjusted by appropriately selecting a material and stretching the material in the step of producing the substrate layer.

In the present disclosure, the substrate layer may have a 50% modulus in the range of 0.1 to 5 MPa, 0.5 to 4.5 MPa, or 1 to 4 MPa. At a 50% modulus of 0.1 MPa or more, a load applied to the adhesive tape or an adherend causes fewer problems associated with a change in shape, such as displacement. At a 50% modulus of 5 MPa or less, an operator can pull the adhesive tape with a relatively light force at an early stage of peeling the adhesive tape from an adherend.

The 50% modulus of the substrate layer is measured by punching the substrate layer into a dumbbell with a gauge length of 20 mm and a width of 5 mm, pulling the substrate layer in a measurement atmosphere of 23° C. and 50% RH using a Tensilon tensile tester (model: RTF-1210, manufactured by A&D Company, Limited) at a crosshead speed of 500 mm/min in the longitudinal direction, and measuring the stress at 50% elongation.

The 50% modulus can be adjusted by appropriately selecting a material and stretching the material in the step of producing the substrate layer.

In the present disclosure, the substrate layer may have a rubber hardness in the range of 25 to 90 A, 30 to 85 A, or 35 to 80 A. When the rubber hardness is 25 A or more, the adhesive tape can be stretched and peeled off without breakage. With a rubber hardness of 90 A or less, the substrate layer is soft. When an adherend with the adhesive tape falls, for example, the adhesive tape easily absorbs the impact and can protect the adherend from the impact (the adhesive tape can have improved impact resistance).

The rubber hardness of the substrate layer is Shore A hardness, which is measured with a durometer (spring type rubber hardness tester) (model: GS-719G, manufactured by Teclock) in accordance with JIS K 6253.

The rubber hardness can be adjusted by appropriately selecting a material, for example, by changing the molecular weight of the resin or by changing a styrene monomer unit if contained.

The substrate layer has an average thickness in the range of 10 to 500 μm, preferably 30 to 250 μm, more preferably 50 to 200 μm. When the thickness is 10 μm or more, the adhesive tape can have desired strength. When the thickness is 500 μm or less, the adhesive tape cannot be difficult to pull due to an excessive thickness.

The phrase "the thickness of the substrate layer", as used herein, refers to the average value of thicknesses measured at 5 positions in the substrate layer with a TH-104 paper/film thickness meter (manufactured by Tester Sangyo Co., Ltd.).

The thickness ratio of the adhesive layer to the substrate layer is not particularly limited and can be appropriately selected for each purpose. The thickness ratio of the adhesive layer to the substrate layer represented by [the thickness of the adhesive layer/the thickness of the substrate layer] preferably ranges from 1/6 to 6/1, more preferably 1/3 to 3/1, still more preferably 1/2 to 2/1. When the thickness ratio of the adhesive layer to the substrate layer is in such a preferred range, the adhesive tape can have high adhesiveness and repeelability (ease of peeling). On the other hand, a thickness ratio of more than 5/1 may result in only the adhesive layer remaining on an adherend in the re-peeling step of the adhesive tape. A thickness ratio of less than 1/5 may result in lower adhesive strength for an adherend with an uneven surface profile or the like because the adhesive layer cannot follow the surface profile.

The material of the substrate layer may be any material of a substrate layer with the specific physical properties described above and may contain, as a main component, a styrene resin, such as a styrene-isoprene copolymer, a styrene-isoprene-styrene copolymer, a styrene-isoprene-butadiene-styrene copolymer, a styrene-butadiene-styrene copolymer, a styrene-ethylene-butylene copolymer, or a styrene-ethylene-propylene copolymer; a polyurethane resin, such as an ester polyurethane or an ether polyurethane; a polyolefin resin, such as polyethylene or polypropylene; a polyester resin, such as poly(ethylene terephthalate), poly(butylene terephthalate), or poly(ethylene naphthalate); polystyrene; polycarbonate; polymethylpentene; polysulfone; poly(ether ether ketone); poly(ether sulfone); poly(ether imide); a polyimide film; a fluoropolymer; nylon; or an acrylic resin. These may be used alone or in combination and are preferably used in combination.

Among these, a styrene resin or a polyurethane resin is preferred to easily achieve a suitable breaking stress and elongation at break. A styrene resin is more preferred. A combination of a styrene-isoprene copolymer and a styrene-isoprene-styrene copolymer is particularly preferred.

A main component of the material of the substrate layer constitutes 50% by mass or more of the total material of the substrate layer.

The styrene resin is a thermoplastic resin, has high formability in extrusion, injection molding, or the like, and can easily form a substrate layer. Among a resin group generally referred to as thermoplastic resins, the styrene resin can easily have particularly high elongation at break and can be suitably used as a substrate layer of an adhesive sheet.

Thus, in the material of the substrate layer, the ratio (mass) of the styrene resin to all the resin components (or the total material) preferably ranges from 50% to 100%, more preferably 60% to 100%, still more preferably 65% to 100%, particularly preferably 70% to 100%. When the ratio of the styrene resin is in such a preferred range, the resulting substrate layer can have high elongation at break and breaking stress.

The styrene resin may be, for example, a resin with a single structure, such as a linear structure, a branched structure, or a multi-branched structure, or a resin with a combination of different structures. A styrene resin rich in a linear structure can provide the substrate layer with high elongation at break. On the other hand, a styrene resin with a branched structure or a multi-branched structure and with a styrene block at a molecular end can have a pseudo-cross-linked structure and can provide high cohesive force. Thus, styrene resins may be used in combination depending on necessary mechanical characteristics.

The styrene resin may have a structural unit represented by the following chemical formula (A) in the range of 5% to 50% by mass, 5% to 40% by mass, 10% to 30% by mass, or 15% to 25% by mass, of the total mass of the styrene resin. When the ratio of the structural unit represented by the following chemical formula (A) to the total mass of the styrene resin is in such a preferred range, the elongation at break and breaking stress can be easily achieved in a suitable range. * in the following chemical formula (A) denotes a bonding arm to another atom, and the same applies to the chemical formula (B) and the chemical formulae (1) to (6) described later.

[Chem. 2]

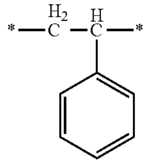

(A)

When the styrene resin is a combination of a styrene-isoprene copolymer and a styrene-isoprene-styrene copolymer, the styrene-isoprene copolymer content preferably ranges from 0% to 80% by mass, more preferably 0% to 70% by mass, still more preferably 0% to 50% by mass, particularly preferably 0% to 30% by mass, of the total mass of the styrene-isoprene copolymer and the styrene-isoprene-styrene copolymer. A styrene-isoprene copolymer content in such a preferred range can result in high thermal durability as well as high elongation at break and breaking stress.

The styrene-isoprene copolymer may have a weight-average molecular weight in the range of 10,000 to 800,000, 30,000 to 500,000, or 50,000 to 300,000, as measured by gel permeation chromatography (GPC) on the basis of polystyrene standards. When the styrene-isoprene copolymer has a weight-average molecular weight in such a preferred range, it is possible to ensure thermal fluidity and compatibility at the time of solvent dilution, and therefore a substrate layer with high thermal durability can be formed with good workability in a production process.

The weight-average molecular weight of a styrene-isoprene copolymer by the GPC method is measured with a GPC apparatus (SC-8020 manufactured by Tosoh Corporation) on the basis of polystyrene standards under the following conditions.

"Measurement Conditions"

Sample concentration: 0.5% by mass (tetrahydrofuran solution)

Sample injection volume: 100 μL

Eluent: tetrahydrofuran

Flow rate: 1.0 mL/min

Measurement temperature: 40° C.

Column: TSKgel (registered trademark) GMHHR-H(20) two columns

Guard column: TSKgel HXL-H

Detector: differential refractometer

Standard polystyrene molecular weight: 10,000 to 20 million (manufactured by Tosoh Corporation)

A styrene-isoprene copolymer, a styrene-isoprene-styrene copolymer, and a mixture of a styrene-isoprene copolymer and a styrene-isoprene-styrene copolymer may be produced by any method, which can be appropriately selected from known production methods, and may be produced by preparing a block copolymer by an anionic living polymerization method, if necessary, in the presence of a coupling agent.

More specifically, a styrene-isoprene copolymer may be produced by any method, which can be appropriately selected from known production methods, for example, by sequentially polymerizing a styrene block and an isoprene block by an anionic living polymerization method.

A styrene-isoprene-styrene copolymer may be produced by any method, which can be appropriately selected from known production methods, for example, by a method of sequentially polymerizing a styrene block and an isoprene block by an anionic living polymerization method, a method of producing a block copolymer with a living active terminal and then reacting the block copolymer with a coupling agent to produce a coupled block copolymer, or the like.

A mixture of a styrene-isoprene copolymer and a styrene-isoprene-styrene copolymer may be produced by any method, which can be appropriately selected from known production methods, for example, by a method of mixing the styrene-isoprene copolymer and the styrene-isoprene-styrene copolymer each produced by the method described above.

A mixture of a styrene-isoprene copolymer and a styrene-isoprene-styrene copolymer may also be produced as a mixture in a single polymerization step.

In a more specific embodiment, first, a styrene monomer is polymerized by an anionic living polymerization method in a polymerization solvent using an anionic polymerization initiator to form a polystyrene block with a living active terminal. Second, isoprene is polymerized from the living active terminal of the polystyrene block to produce a styrene-isoprene diblock copolymer with a living active terminal. Third, a portion of the styrene-isoprene diblock copolymer with the living active terminal is reacted with a coupling agent to produce a coupled styrene-isoprene-styrene block copolymer. Fourth, the living active terminal in the remainder of the styrene-isoprene diblock copolymer with the living active terminal is deactivated with a polymerization terminator to produce a styrene-isoprene diblock copolymer.

The polyurethane resin is not particularly limited and can be appropriately selected for each purpose. The polyurethane resin may have a softening point of 40° C. or more, or 50° C. or more. The upper limit of the softening point may be 100° C. or less. The softening point is a value measured in accordance with JIS K 2207 (ring and ball) (the softening point is hereinafter measured in the same manner).

The polyurethane resin can suitably be a reaction product of a polyol (b1-1) and a polyisocyanate (b1-2).

The polyol (b1-1) is not particularly limited and can be appropriately selected for each purpose. For example, the polyol (b1-1) is a polyester polyol, a polyether polyol, a polycarbonate polyol, or an acrylic polyol. These may be used alone or in combination. Among these, the polyol (b1-1) may be a polyester polyol or a polyether polyol in terms of the mechanical characteristics of the substrate layer. In the substrate layer, a polyester polyol may be used in terms of heat resistance, and a polyether polyol may be used in terms of water resistance or resistance to biodegradation.

The polyester polyol is, for example, a polyester produced by an esterification reaction of a low-molecular-weight polyol and a polycarboxylic acid, a polyester produced by a ring-opening polymerization of a cyclic ester compound, such as ε-caprolactone, or a copolyester thereof.

The low-molecular-weight polyol usable for the production of the polyester polyol is, for example, an aliphatic alkylene glycol with a weight-average molecular weight in the range of approximately 50 to 300, such as ethylene glycol, propylene glycol, 1,4-butanediol, 1,6-hexanediol, diethylene glycol, neopentyl glycol, or 1,3-butanediol, or cyclohexanedimethanol.

The polycarboxylic acid is, for example, an aliphatic dicarboxylic acid, such as succinic acid, adipic acid, sebacic acid, or dodecanedicarboxylic acid; an aromatic dicarboxylic acid, such as terephthalic acid, isophthalic acid, phthalic acid, or naphthalenedicarboxylic acid; or an anhydride or esterified product thereof.

The polyether polyol is, for example, produced by addition polymerization of an alkylene oxide using one or two or more compounds with two or more active hydrogen atoms as an initiator.

The polycarbonate polyol is, for example, produced by reacting carbonate and/or phosgene with a low-molecular-weight polyol described later.

The carbonate is, for example, methyl carbonate, dimethyl carbonate, ethyl carbonate, diethyl carbonate, cyclocarbonate, or diphenyl carbonate.

The low-molecular-weight polyol that can be used for the production of the polycarbonate polyol and can react with carbonate and/or phosgene is, for example, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, 2,3-butanediol, 1,5-pentanediol, 1,5-hexanediol, 1,6-hexanediol, 2,5-hexanediol, 1,7-heptanediol, 1,8-octanediol, 1,9-nonanediol, 1,10-decanediol, 1,11-undecanediol, 1,12-dodecanediol, 2-methyl-1,3-propanediol, neopentyl glycol, 2-butyl-2-ethyl-1,3-propanediol, 3-methyl-1,5-pentanediol, 2-ethyl-1,3-hexanediol, 2-methyl-1,8-octanediol, 1,4-cyclohexanedimethanol, hydroquinone, resorcin, bisphenol A, bisphenol F, or 4,4'-biphenol.

The polyisocyanate (b1-2) is not particularly limited and can be appropriately selected for each purpose. For example, the polyisocyanate (b1-2) is an alicyclic polyisocyanate, an aliphatic polyisocyanate, or an aromatic polyisocyanate, or an alicyclic polyisocyanate. These may be used alone or in combination.

The alicyclic polyisocyanate is, for example, isophorone diisocyanate, 1,3-bis(isocyanatomethyl)cyclohexane, 4,4'-dicyclohexylmethane diisocyanate, 2,4-methylcyclohexane diisocyanate, 2,6-methylcyclohexane diisocyanate, cyclohexylene diisocyanate, methylcyclohexylene diisocyanate, bis(2-isocyanatoethyl)-4-cyclohexylene-1,2-dicarboxylate, 2,5-norbornane diisocyanate, 2,6-norbornane diisocyanate, dimer acid diisocyanate, or bicycloheptane triisocyanate. These may be used alone or in combination.

A polyurethane resin (b1) may be produced by reacting the polyol (b1-1) with the polyisocyanate (b1-2) by any method, which can be appropriately selected from known production methods, for example, by heating the polyol (b1-1) in a reaction vessel at atmospheric or reduced pressure to remove water and then supplying the polyisocyanate (b1-2) once or multiple times for the reaction.

The reaction between the polyol (b1-1) and the polyisocyanate (b1-2) may be performed at an equivalent ratio (NCO/OH equivalent ratio) of the isocyanate group (NCO) of the polyisocyanate (b1-2) to the hydroxy group (OH) of the polyol (b1-1) in the range of 1.0 to 20.0, 1.1 to 13.0, 1.2 to 5.0, or 1.5 to 3.0.

The reaction conditions for the polyol (b1-1) and the polyisocyanate (b1-2) are not particularly limited and can be appropriately selected in consideration of various conditions, such as safety, quality, and cost. The reaction temperature preferably ranges from 70° C. to 120° C., and the reaction time preferably ranges from 30 minutes to 5 hours.

To react the polyol (b1-1) with the polyisocyanate (b1-2), if necessary, a tertiary amine catalyst, an organometallic catalyst, or the like may be used as a catalyst.

The reaction may be performed in a solvent-free environment or in the presence of an organic solvent.

The organic solvent is not particularly limited and can be appropriately selected for each purpose. For example, the organic solvent is an ester solvent, such as methyl acetate, ethyl acetate, propyl acetate, or butyl acetate; a ketone solvent, such as acetone, methyl ethyl ketone, methyl butyl ketone, or cyclohexanone; an ether ester solvent, such as methyl cellosolve acetate or butyl cellosolve acetate; an aromatic hydrocarbon solvent, such as toluene or xylene; or an amide solvent, such as dimethylformamide or dimethylacetamide. These may be used alone or in combination.

The organic solvent may be removed during the production of the polyurethane resin (b1) or after the production of the polyurethane (b1) by an appropriate method, such as heating under reduced pressure or drying at atmospheric pressure.

Another component in the substrate layer is not particularly limited and can be appropriately selected within the scope of not impairing the characteristics of the adhesive tape. For example, the other component is a tackifier resin; a polymer component other than the material of the substrate layer; an additive agent, such as a cross-linker, an age resister, an ultraviolet absorber, a filler, a polymerization inhibitor, a surface conditioner, an antistatic agent, an anti-foaming agent, a viscosity modifier, a light stabilizer, a weathering stabilizer, a heat stabilizer, an antioxidant, a leveling agent, an organic pigment, an inorganic pigment, a pigment dispersant, silica beads, or organic beads; or an inorganic filler, such as silicon oxide, aluminum oxide, titanium oxide, zirconia, or antimony pentoxide. These may be used alone or in combination.

The other component content of the substrate layer can be appropriately selected within the scope of not impairing the characteristics of the adhesive tape.

The tackifier resin can be used to improve the adhesion between the adhesive layer and the substrate layer of the adhesive tape or to improve the heat resistance.

The tackifier resin is not particularly limited and can be appropriately selected for each purpose. The tackifier resin may have a softening point of 80° C. or more, 90° C. or more, 100° C. or more, or 110° C. or more.

The tackifier resin is, for example, one described later for a "rubber adhesive resin", and preferred embodiments are also the same.

The age resister is not particularly limited and can be appropriately selected from known age resisters for each purpose. For example, the age resister is a phenolic age resister, a phosphorus age resister (sometimes referred to as a "processing stabilizer"), an amine age resister, or an imidazole age resister. These may be used alone or in combination. Among these, a phenolic age resister and a phosphorus age resister are preferred, and a combination thereof may be used because the combination can effectively improve the thermal stability of the substrate material and can consequently provide an adhesive tape that retains high initial adhesiveness and has higher thermal durability. The phosphorus age resister may slightly change color (yellowing) over time in a high-temperature environment. Thus, preferably, the amount of phosphorus age resister to be used is appropriately determined in consideration of the balance between initial adhesiveness, thermal durability, and prevention of discoloration.

The phenolic age resister may typically be a phenolic compound with a steric hindrance group, represented by a monophenol, bisphenol, or polyphenol type. Specific examples include 2,6-di-t-butyl-4-methylphenol, 2,2'-methylenebis(4-methyl-6-t-butylphenol), 2,2'-methylenebis(4-ethyl-6-t-butylphenol), 4,4'-thiobis(6-t-butyl-3-methylphenol), 4,4'-butylidenebis-(3-methyl-6-t-butylphenol), tetrakis-[methylene-3-(3'5'-di-t-butyl-4-hydroxyphenyl)propionate]methane, and n-octadecyl-3-(4'-hydroxy-3'5'-di-t-butylphenyl)propionate. These may be used alone or in combination.

The amount of phenolic age resister to be used is not particularly limited and can be appropriately selected for each purpose, and preferably ranges from 0.1 to 5 parts by mass per 100 parts by mass of the substrate material. The use of 0.5 to 3 parts by mass of the phenolic age resister can effectively improve the thermal stability of the substrate material and consequently provide an adhesive tape that retains high initial adhesiveness and has higher thermal durability.

"Adhesive Layer"

An adhesive layer in one or more embodiments of the present invention contains an adhesive resin and an optional tackifier resin and/or an optional filler. An adhesive layer in one or more embodiments of the present invention is formed of an adhesive composition containing an adhesive resin, an optional tackifier resin, an optional filler, and/or another optional component described later.

In the present disclosure, the adhesive layer may have a storage modulus G' (23° C.) in the range of $1.0\times10^5$ to $1.0\times10^7$ Pa, $1.0\times10^5$ to $1.0\times10^6$ Pa, $1.5\times10^5$ to $9.0\times10^5$ Pa, or $2.0\times10^5$ to $8.0\times10^5$ Pa. The storage modulus G' (23° C.) of the adhesive layer has an effect of achieving high initial adhesiveness, high-load holding power, and temporal repeelability. Furthermore, an adhesive layer with a breaking point stress in such a range can easily follow the distortion of an adherend, easily have high adhesive strength, ensure the dimensional stability of the substrate layer, and therefore have suitable attaching workability.

The adhesive layer may have any stress at 25% elongation, which can be appropriately selected for each purpose and preferably ranges from 0.04 to 0.4 MPa, more preferably 0.05 to 0.1 MPa. When the stress at 25% elongation of the adhesive layer is in a preferred range, the adhesive tape can have suitable adhesive strength and can be relatively easily peeled off when stretched and peeled off. On the other hand, when the stress at 25% elongation of the adhesive layer is less than 0.04 MPa, the adhesive tape may be peeled off by loading in a shear direction of the adhesive tape while hard adherends are fixed together. A stress of more than 0.4 MPa may result in excessive force to stretch and peel off the adhesive tape.

The stress at 25% elongation of the adhesive layer is measured by punching the adhesive layer into a dumbbell with a gauge length of 20 mm and a width of 10 mm, pulling the adhesive layer in a measurement atmosphere of 23° C. and 50% RH using a Tensilon tensile tester (model: RTF-1210, manufactured by A&D Company, Limited) at a crosshead speed of 300 mm/min in the longitudinal direction, and measuring the stress at 25% elongation.

The adhesive layer may have any breaking stress, which can be appropriately selected for each purpose and preferably ranges from 0.5 to 2.1 MPa, more preferably 1.0 to 2.1 MPa. When the breaking stress of the adhesive layer is in such a preferred range, the adhesive tape is less likely to be broken when stretched and peeled off, and the load to stretch the adhesive tape is not excessive. This facilitates re-peeling work of peeling off the adhesive tape. On the other hand, when the breaking stress of the adhesive layer is less than 0.5 MPa, the adhesive agent may remain due to cohesive failure of the adhesive layer when stretched and peeled off. When the breaking stress is more than 2.1 MPa, sufficient adhesiveness may not be achieved. The force required to stretch and change the shape of the adhesive tape also depends on the thickness of the adhesive tape. For example, when a thick adhesive tape with high breaking stress is stretched and peeled off, the adhesive tape may not be sufficiently stretched and peeled off.

The breaking stress of the adhesive layer is measured by punching the adhesive layer into a dumbbell with a gauge length of 20 mm and a width of 10 mm, pulling the adhesive layer in a measurement atmosphere of 23° C. and 50% RH using a Tensilon tensile tester (model: RTF-1210, manufactured by A&D Company, Limited) at a crosshead speed of 300 mm/min in the longitudinal direction, and measuring the stress at break.

The adhesive layer may have any elongation at break, which can be appropriately selected for each purpose and preferably ranges from 450% to 1300%, more preferably 500% to 1200%, still more preferably 600% to 1100%. When the elongation at break of the adhesive layer is in such a preferred range, both suitable adhesiveness and repeelability (ease of peeling) can be achieved.

The elongation at break of the adhesive layer is measured by punching the adhesive layer into a dumbbell with a gauge length of 20 mm and a width of 10 mm, pulling the adhesive layer in a measurement atmosphere of 23° C. and 50% RH using a Tensilon tensile tester (model: RTF-1210, manufactured by A&D Company, Limited) at a crosshead speed of 300 mm/min in the longitudinal direction, and measuring the tensile elongation percentage at break.

The adhesive layer may have any average thickness, which can be appropriately selected for each purpose and preferably ranges from 1 to 200 μm, more preferably 10 to 150 μm, still more preferably 30 to 120 μm, particularly preferably 40 to 100 μm. The "average thickness of the adhesive layer" refers to the thickness of the adhesive layer on one surface of the adhesive tape. For an adhesive tape with an adhesive layer on both surfaces, the average thickness of the adhesive layer on one surface may be the same as or different from, preferably the same as, the average thickness of the adhesive layer on the other surface.

In the present description, the average thickness of an adhesive layer can be measured by the following method. An adhesive tape is immersed in liquid nitrogen for 1 minute and is then folded and broken with tweezers along a transverse folding line in the liquid nitrogen, thus preparing a section for observing a fracture surface in the thickness direction of the adhesive tape. The section is returned to room temperature in a desiccator and is then fixed to a sample stage such that an electron beam is incident perpendicularly to the fracture surface. The fracture surface is observed with an electron microscope. The thickness of the adhesive layer in the adhesive tape is measured at 10 positions on the basis of the scale of the electron microscope, and the arithmetic mean thereof is taken as the thickness of the adhesive layer. The thickness of the adhesive layer is a length measured from one surface to the other surface in the stacking direction.

<Adhesive Resin>

An adhesive resin used for an adhesive layer in one or more embodiments of the present invention may contain, as a main component of the adhesive resin, an acrylic adhesive resin containing an acrylic block copolymer or an aromatic vinyl adhesive resin containing a styrene block copolymer. The phrase "a main component of the adhesive resin", as used herein, refers to a main resin component in the adhesive resin (typically a component contained in an amount of more than 50% by mass).

The acrylic block copolymer may constitute 30% to 100% by mass, or 50% to 95% by mass, of the total adhesive resin used for an adhesive layer in one or more embodiments of the present invention.

In an adhesive layer in one or more embodiments of the present invention, at an acrylic block copolymer content of 30% or more by mass, both repeelability and high-load holding power can be easily satisfied. The styrene block copolymer may constitute 30% to 100% by mass, or 50% to 100% by mass, of the total adhesive resin used for an adhesive layer in one or more embodiments of the present invention.

In an adhesive layer in one or more embodiments of the present invention, at a styrene block copolymer content of 30% or more by mass, both repeelability and high-load holding power can be easily satisfied.

<<Acrylic Adhesive Resin Containing Acrylic Block Copolymer>>

An acrylic block copolymer in one or more embodiments of the present invention may be a triblock copolymer with a repeating unit represented by the general formula (1):

[Chem. 3]

$$*\!-\!\left(A\right)_p\!\left(B\right)_q\!\left(C\right)_r\!-\!* \quad (1)$$

wherein A, B, and C independently denote a repeating unit, A and C independently denote an alkyl methacrylate monomer unit, B denotes an alkyl acrylate monomer unit, p, q, and r independently denote the degree of polymerization of their respective monomer units, A and C may be the same or may denote an alkyl methacrylate monomer unit with a different chemical structure, and denotes a bonding arm to another atom.

In the general formula (1), A and C denote a repeating unit different from B and denote an alkyl methacrylate monomer unit. A and C are independent of each other and may be the same alkyl methacrylate monomer unit or may be an alkyl methacrylate monomer unit with a different chemical structure. The term “alkyl methacrylate monomer unit”, as used herein, refers to a constitutional unit derived from an alkyl methacrylate monomer, that is, a repeating unit derived from an alkyl methacrylate monomer, in a (co)polymer or a graft polymer of the alkyl methacrylate monomer. In one or more embodiments of the present invention, an alkyl methacrylate monomer unit may be represented by the following general formula (2):

[Chem. 4]

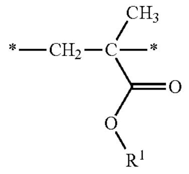

(2)

wherein $R^1$ denotes an alkyl group having 1 to 12 carbon atoms, one or two or more hydrogen atoms in the alkyl group may be substituted with a substituent $R^2$, and the substituent $R^2$ denotes a halogen atom, an amino group, or a cyano group.

In the general formula (2), from the perspective of repeelability and high-load holding power, $R^1$ may denote an alkyl group having 1 to 12 carbon atoms, an alkyl group having 1 to 4 carbon atoms, or an alkyl group having 1 or 2 carbon atoms.

In the general formula (2), the alkyl group having 1 to carbon atoms may be linear, branched, or cyclic and is preferably linear or branched, more preferably linear, in terms of adhesive strength.

In the general formula (2), the alkyl group having 1 to carbon atoms is, for example, a linear or branched alkyl group, such as a methyl group, an ethyl group, a propyl group, an isopropyl group, a n-butyl group, an isobutyl group, a t-butyl group, a n-pentyl group, an isopentyl group, a hexyl group, an octyl group, a nonyl group, a decyl group, an undecyl group, or a dodecyl group, or a cyclic alkyl group, such as a cyclobutyl group, a cyclopentyl group, a cyclohexyl group, a cycloheptyl group, a cyclooctyl group, a cyclononyl group, a cyclodecyl group, a dicyclopentanyl group, or an adamantyl group. Among these, from the perspective of repeelability and high-load holding power, a methyl group, an ethyl group, a propyl group, an isopropyl group, a n-butyl group, an isobutyl group, or a t-butyl group is preferred, and a methyl group, an ethyl group, or a propyl group is more preferred.

In the general formula (2), the alkyl group having 1 to 4 carbon atoms is, for example, a linear or branched alkyl group, such as a methyl group, an ethyl group, a propyl group, an isopropyl group, a n-butyl group, an isobutyl group, or a t-butyl group, or a cyclic alkyl group, such as a cyclobutyl group. From the perspective of repeelability and high-load holding power, the alkyl group having 1 to 4 carbon atoms may be a methyl group, an ethyl group, a propyl group, an isopropyl group, a n-butyl group, an isobutyl group, or a t-butyl group, or a methyl group.

Thus, preferred $R^1$ in the general formula (2) denotes an alkyl group selected from a methyl group, an ethyl group, a propyl group, an isopropyl group, a n-butyl group, an isobutyl group, a t-butyl group, and a cyclobutyl group, and one or two or more hydrogen atoms in the alkyl group may be substituted with a halogen atom, an amino group, or a cyano group.

In the present disclosure, for example, the alkyl methacrylate monomer is, but not limited to, methyl methacrylate, ethyl methacrylate, n-propyl methacrylate, isopropyl methacrylate, n-butyl methacrylate, isobutyl methacrylate, sec-butyl methacrylate, t-butyl methacrylate, n-pentyl methacrylate, isopentyl methacrylate, n-hexyl methacrylate, 2-ethylhexyl methacrylate, pentadecyl methacrylate, cyclohexyl methacrylate, lauryl methacrylate, tridecyl methacrylate, or 2-hexyldecyl methacrylate. Among these, methyl methacrylate is preferred in terms of high-load holding power and disassemblability.

In the general formula (1), B denotes a repeating unit different from A and C and denotes an alkyl acrylate monomer unit. The term “alkyl acrylate monomer unit”, as used herein, refers to a constitutional unit derived from an alkyl acrylate monomer, that is, a repeating unit derived from an alkyl acrylate monomer, in a (co)polymer or a graft polymer of the alkyl acrylate monomer. In one or more embodiments of the present invention, an alkyl acrylate monomer may be represented by the following general formula (3):

[Chem. 5]

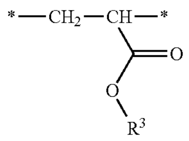

(3)

wherein $R^3$ denotes an alkyl group having 1 to 12 carbon atoms, one or two or more hydrogen atoms in the alkyl group may be substituted with a substituent $R^4$, and the substituent $R^4$ denotes a halogen atom, an amino group, or a cyano group.

In the general formula (3), from the perspective of adhesiveness, $R^3$ may denote an alkyl group having 1 to 20 carbon atoms, or an alkyl group having 4 to 8 carbon atoms.

In the general formula (3), the alkyl group having 1 to carbon atoms may be linear, branched, or cyclic and is preferably linear or branched in terms of adhesiveness. Examples of the alkyl group having 1 to 12 carbon atoms and the alkyl group having 4 to 8 carbon atoms are the same as the examples of the alkyl group having 1 to 12 carbon atoms in the general formula (2).

Thus, preferred $R^3$ in the general formula (3) is a linear or branched alkyl group, such as a methyl group, an ethyl group, a propyl group, an isopropyl group, a n-butyl group, an isobutyl group, a t-butyl group, a n-pentyl group, an isopentyl group, a hexyl group, an octyl group, a nonyl group, a decyl group, an undecyl group, or a dodecyl group, or a cyclic alkyl group, such as a cyclobutyl group, a cyclopentyl group, a cyclohexyl group, a cycloheptyl group, a cyclooctyl group, a cyclononyl group, a cyclodecyl group, a dicyclopentanyl group, or an adamantyl group, and one or two or more hydrogen atoms in the alkyl group may be substituted with a halogen atom, an amino group, or a cyano group.

In the present disclosure, the alkyl acrylate monomer is, for example, methyl acrylate, ethyl acrylate, n-propyl acrylate, isopropyl acrylate, n-butyl acrylate, isobutyl acrylate, sec-butyl acrylate, t-butyl acrylate, amyl acrylate, isoamyl acrylate, n-hexyl acrylate, 2-ethylhexyl acrylate, or lauryl acrylate. Among these, n-butyl acrylate, 2-ethylhexyl acrylate, and copolymers thereof are preferred in terms of both adhesive strength and repeelability.

In the general formula (1), p, q, and r independently denote the degree of polymerization of their respective monomer units. Each value of p, q, and r is related to the molecular weight and the like. p/(p+q+r) preferably ranges from 0.02 to 0.40, more preferably 0.05 to 0.37. q/(p+q+r) preferably ranges from 0.20 to 0.95, more preferably 0.25 to 0.90. r/(p+q+r) preferably ranges from 0.02 to 0.40, more preferably 0.05 to 0.37.

In the present disclosure, the acrylic block copolymer may have a repeating unit represented by the following general formula (4):

[Chem. 6]

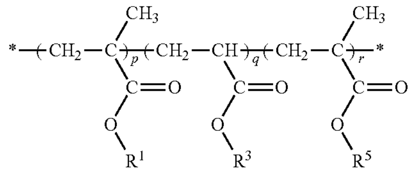

(4)

wherein $R^1$ and $R^5$ independently denote an alkyl group having 1 to 12 carbon atoms, one or two or more hydrogen atoms in the alkyl group may be substituted with a substituent $R^2$, and the substituent $R^2$ denotes a halogen atom, an amino group, or a cyano group; $R^3$ denotes an alkyl group having 1 to 12 carbon atoms, one or two or more hydrogen atoms in the alkyl group may be substituted with a substituent $R^4$, and the substituent $R^4$ denotes a halogen atom, an amino group, or a cyano group; and p, q, and r independently denote the degree of polymerization of their respective monomer units.

In the general formula (4), $R^1$ may be the same as $R^1$ in the general formula (2). In the general formula (4), $R^3$ may be the same as $R^3$ in the general formula (3). In the general formula (4), $R^5$ may be the same as $R^1$ in the general formula (2). In the general formula (4), p, q, and r may be the same as p, q, and r in the general formula (1). In the general formula (4), $R^1$ and $R^5$ may be the same or different.

In the present disclosure, when the triblock copolymer is represented by the general formula (4), preferably, $R^1$ is selected from the group consisting of linear or branched alkyl groups, such as a methyl group, an ethyl group, a propyl group, an isopropyl group, a n-butyl group, an isobutyl group, and a t-butyl group, and a cyclobutyl group, $R^3$ is selected from the group consisting of a methyl group, an ethyl group, a propyl group, an isopropyl group, a n-butyl group, an isobutyl group, a t-butyl group, a n-pentyl group, an isopentyl group, a hexyl group, an octyl group, a nonyl group, a decyl group, and an undecyl group, $R^5$ is selected from the group consisting of linear or branched alkyl groups, such as a methyl group, an ethyl group, a propyl group, an isopropyl group, a n-butyl group, an isobutyl group, and a t-butyl group, and a cyclobutyl group, p/(p+q+r) ranges from 0.02 to 0.40, q/(p+q+r) ranges from 0.20 to 0.95, and r/(p+q+r) ranges from 0.02 to 0.40.

In a triblock copolymer in one or more embodiments of the present invention, A and C in the general formula (1) may be the same. More specifically, when the triblock copolymer has a repeating unit represented by the general formula (4), preferably, $R^1$ and $R^5$ are the same group, p/(p+q+r) ranges from 0.02 to 0.40, q/(p+q+r) ranges from 0.20 to 0.95, and r/(p+q+r) ranges from 0.02 to 0.40.

In a triblock copolymer with a repeating unit represented by the general formula (1), a triblock copolymer with the same A and C (an A-B-A triblock copolymer) can have a higher elastic modulus and can therefore more easily have adhesive strength with high high-load holding power, temporal repeelability, and storage stability.

An acrylic block copolymer in one or more embodiments of the present invention may be a diblock copolymer with a repeating unit represented by the general formula (5):

[Chem. 7]

$$*-(D)_s-(E)_t-* \qquad (5)$$

wherein D and E independently denote a repeating unit, D denotes an alkyl methacrylate monomer unit, E denotes an alkyl acrylate monomer unit, s and t independently denote the degree of polymerization of their respective monomer units, and * denotes a bonding arm to another atom.

In the present disclosure, the acrylic block copolymer used for the adhesive resin may be at least one selected from the group consisting of the triblock copolymers represented by the general formula (1) and the triblock copolymers represented by the general formula (5). In particular, the use of a combination of a triblock copolymer and a diblock copolymer for the adhesive resin can more easily ensure a high elastic modulus and initial adhesiveness and can therefore more easily ensure the high-load holding power, temporal repeelability, and initial adhesive strength. In particular, when the adhesive layer contains a filler, and the adhesive tape is pulled, the filler in the adhesive layer is exposed on the surface for a longer period than in the adhesive layer without the filler. Thus, a good synergistic effect in combination with the effects of the filler is exhibited.

The alkyl methacrylate monomer unit and the alkyl acrylate monomer unit in the general formula (5) may be the same as the alkyl methacrylate monomer unit and the alkyl acrylate monomer unit in the general formula (1).

A diblock polymer in one or more embodiments of the present invention may have a repeating unit represented by the following general formula (6):

[Chem. 8]

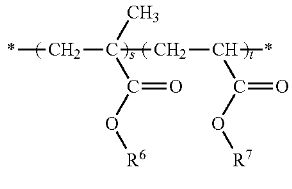

(6)

wherein $R^6$ denotes an alkyl group having 1 to 12 carbon atoms, one or two or more hydrogen atoms in the alkyl group may be substituted with a substituent $R^8$, and the substituent $R^8$ denotes a halogen atom, an amino group, or a cyano group; $R^7$ denotes an alkyl group having 1 to 12 carbon atoms, one or two or more hydrogen atoms in the alkyl group may be substituted with a substituent $R^9$, and the substituent $R^9$ denotes a halogen atom, an amino group, or a cyano group; and s and t independently denote the degree of polymerization of their respective monomer units.

In the general formula (6), $R^6$ may be the same as $R^1$ in the general formula (2). In the general formula (6), $R^7$ may be the same as $R^3$ in the general formula (3). In the general formula (6), s and t may be the same as p and q in the general formula (1).

In the present disclosure, the diblock copolymer may have a weight-average molecular weight Mw in the range of 50,000 to 300,000 and a number-average molecular weight Mn in the range of 50,000 to 300,000. The weight-average molecular weight may be measured by a method for measuring the weight-average molecular weight of a triblock copolymer in one or more embodiments of the present invention.

In the general formula (6), p, q, and r independently denote the degree of polymerization of their respective monomer units. Each value of s and t is related to the molecular weight and the like. s/(s+t) preferably ranges from 0.01 to 0.99, more preferably 0.1 to 0.9. t/(s+t) preferably ranges from 0.01 to 0.99, more preferably 0.1 to 0.9.

In the present disclosure, the diblock copolymer content is not particularly limited and can be appropriately selected for each purpose. In the present disclosure, the diblock copolymer content preferably ranges from 0 to 100 parts by mass, more preferably 1 to 50 parts by mass, still more preferably 10 to 50 parts by mass, per 100 parts by mass of a triblock copolymer. A tackifier resin content of the adhesive layer in such a range tends to result in high adhesiveness to an adherend.

In the present disclosure, the acrylic block copolymer may have a weight-average molecular weight Mw in the range of 50,000 to 300,000 and a number-average molecular weight Mn in the range of 50,000 to 300,000. The block copolymer may have a weight-average molecular weight Mw in the range of 100,000 to 250,000 and a number-average molecular weight Mn in the range of 100,000 to 250,000. The block copolymer may have a weight-average molecular weight Mw in the range of 130,000 to 230,000 and a number-average molecular weight Mn in the range of 130,000 to 230,000. Suitable ranges of the weight-average molecular weight Mw and the number-average molecular weight Mn of a triblock copolymer represented by the general formula (1) are the same as the ranges described above.

The weight-average molecular weight Mw of the acrylic block copolymer in such a range is preferred in terms of repeelability. The number-average molecular weight Mn of the acrylic block copolymer in such a range is preferred in terms of repeelability.

The weight-average molecular weight Mw and the number-average molecular weight Mn of an acrylic block copolymer and a triblock copolymer represented by the general formula (1) are measured by a GPC method using a GPC apparatus (HLC-8329GPC manufactured by Tosoh Corporation) on the basis of polystyrene standards under the following measurement conditions.

[Measurement Conditions]

Sample concentration: 0.5% by mass (tetrahydrofuran (THF) solution)
Sample injection volume: 100 μL
Eluent: THF
Flow rate: 1.0 mL/min
Measurement temperature: 40° C.
Column: TSKgel GMHHR-H(20) two columns
Guard column: TSKgel HXL-H
Detector: differential refractometer
Standard polystyrene molecular weight: 10,000 to 20 million (manufactured by Tosoh Corporation)

<Stereoregularity>

A triblock copolymer represented by the general formula (1) and/or a partial structure (for example, a block) of a triblock copolymer represented by the general formula (1) in one or more embodiments of the present invention may have stereoregularity (tacticity). More specifically, a triblock copolymer and/or a partial structure (for example, a block) of the triblock copolymer in one or more embodiments of the present invention may have any stereoregularity of isotactic, syndiotactic, or atactic or may have a plurality of blocks with any one of these stereoregularities.

In a preferred form of a triblock copolymer in one or more embodiments of the present invention, the syndiotacticity of a polymer block of the "$-(A)_p-$" moiety in the general formula (1) may have a rr triad content of 65% or more, or 75% to 95%.

In a preferred form of a triblock copolymer in one or more embodiments of the present invention, the syndiotacticity of a polymer block of the "$—(C)_r—$" moiety in the general formula (1) may have a rr triad content of 65% or more, or 75% to 95%.

In a preferred form of a triblock copolymer in one or more embodiments of the present invention, a polymer block of the "$—(B)_q—$" moiety in the general formula (1) may be atactic.

When a triblock copolymer in one or more embodiments of the present invention has a polymer block of the "$-(A)_p-$" moiety with a rr triad content of 65% or more, this results in high repeelability and holding power at high temperatures.

The syndiotacticity of a polymer is typically expressed by the ratio of a rr chain (triad) composed of three monomer units. In the present description, it is calculated by NMR measurement of a polymer. More specifically, a signal peak representing a triad sequence in $^{13}C$-NMR depends on the type of polymer, the measurement solvent, the measurement temperature, or another condition and therefore must be identified and quantified under each measurement condition. In the present description, a sample dissolved in deuterated chloroform is examined at 50° C.

A preferred form of a triblock copolymer in one or more embodiments of the present invention may be poly(methyl methacrylate) block-poly(n-butyl acrylate) block-poly (methyl methacrylate), poly(ethyl methacrylate) block-poly (n-butyl acrylate) block-poly(ethyl methacrylate), poly(propyl methacrylate) block-poly(n-butyl acrylate) block-poly (propyl methacrylate), poly(methyl methacrylate) block-poly(t-butyl acrylate) block-poly(methyl methacrylate), or poly(methyl methacrylate) block-poly(propyl acrylate) block-poly(methyl methacrylate).

As for the overall molecular weight distribution of a triblock copolymer in one or more embodiments of the present invention, the weight-average molecular weight/number-average molecular weight ratio preferably ranges from 0.8 to 2.3, more preferably 1.00 to 1.50.

As for the ratio of the total weight of a polymer block of the "-$(A)_p$-" moiety and a polymer block of the "—$(C)_r$—" moiety to the total weight of a polymer block of the "—$(B)_q$—" moiety in a molecule of a triblock copolymer in one or more embodiments of the present invention, the a/b mass ratio preferably ranges from 5/95 to 80/20, more preferably 10/90 to 75/25, in terms of adhesive properties.

In the present disclosure, when A and C in the general formula (1) are different repeating units, as for the ratio of the total weight of a polymer block of the "-$(A)_p$-" moiety (the total weight of the polymer block of the "-$(A)_p$-" moiety is referred to as "a") to the total weight of a polymer block of the "—$(B)_q$—" moiety (the total weight of the polymer block of the "—$(B)_q$—" moiety is referred to as "b") in a molecule of a triblock copolymer in one or more embodiments of the present invention, the a/b mass ratio preferably ranges from 2/98 to 67/33, more preferably 5/95 to 60/40, in terms of adhesive properties.

In the present disclosure, when A and C in the general formula (1) are different repeating units, as for the ratio of the total weight of a polymer block of the "—$(C)_r$—" moiety (the total weight of the polymer block of the "—$(C)_r$—" moiety is referred to as "c") to the total weight of a polymer block of the "—$(B)_q$—" moiety in a molecule of a triblock copolymer in one or more embodiments of the present invention, the c/b mass ratio preferably ranges from 2/98 to 67/33, more preferably 5/95 to 60/40, in terms of adhesive properties.

In the present disclosure, when A and C in the general formula (1) are the same repeating unit, as for the ratio of the total weight of a polymer block of the "-$(A)_p$-" moiety and a polymer block of the "—$(C)_r$—" moiety (the total weight of the polymer block of the "-$(A)_p$-" moiety and the polymer block of the "—$(C)_r$—" moiety is referred to as "d") to the total weight of a polymer block of the "—$(B)_q$—" moiety (referred to as "b") in a molecule of a triblock copolymer in one or more embodiments of the present invention, the d/b mass ratio preferably ranges from 5/95 to 80/20, more preferably 10/90 to 75/25, in terms of adhesive properties.

If necessary, a triblock copolymer in one or more embodiments of the present invention may be modified with a functional group, such as a hydroxy group, a carboxy group, an acid anhydride group, an amino group, or a trimethoxysilyl group, in a molecular side chain or at a molecular main chain terminal without losing the advantages of one or more embodiments of the present invention.

A triblock copolymer for use in the present disclosure may be produced by any method, which can be appropriately selected from known production methods, for example, by sequentially polymerizing a block copolymer by an anionic living polymerization method or a cationic living polymerization method. When a triblock copolymer for use in the present disclosure has stereoregularity (for example, syndiotacticity), a known method using an organometallic complex may be used.

In an example of a method for producing a triblock copolymer in one or more embodiments of the present invention, a triblock copolymer can be produced by a method in which polymerization of an alkyl methacrylate monomer as a main component and polymerization of a monomer composed mainly of an alkyl acrylate monomer and/or an alkyl methacrylate monomer as a main component are successively performed in a desired block bonding order in an inert polymerization solvent using a polymerization initiator.

In the present disclosure of a method for producing a triblock copolymer, an alkyl methacrylate monomer is first polymerized by an anionic living polymerization method in a polymerization solvent using a polymerization initiator to form a poly(alkyl methacrylate) block with a living active terminal (corresponding to the "-$(A)_p$-" moiety in the general formula (1)). Second, an alkyl acrylate monomer is polymerized from the living active terminal of the poly(alkyl methacrylate) to produce an alkyl methacrylate-alkyl acrylate binary block copolymer with a living active terminal (corresponding to the "-$(A)_p$-$(B)_q$—" moiety in the general formula (1)). Third, a portion of the alkyl methacrylate-alkyl acrylate binary block copolymer with a living active terminal is reacted with a coupling agent to produce a coupled alkyl methacrylate-alkyl acrylate-alkyl methacrylate triblock copolymer (corresponding to the "-$(A)_p$-$(B)_q$—$(C)_r$—" moiety in the general formula (1)). If necessary, the polymerization is terminated by a reaction with a polymerization terminator, such as an alcohol.

The polymerization initiator is, for example, an organometallic compound, such as an organolithium compound or an organometallic complex.

The organometallic complex may be a rare-earth metal complex having a pentamethylcyclopentadienyl group as a ligand, for example, bis(pentamethylcyclopentadienyl)samarium methyl tetrahydrofuranate or bis(pentamethylcyclopentadienyl)yttrium methyl tetrahydrofuranate. Furthermore, the organometallic complex may be used in combination with an alkylaluminum, such as trimethylaluminum.

The organolithium compound may be an alkyllithium, such as t-butyllithium, or a compound produced by a reaction between an alkyllithium and 1,1-diphenylethylene or diphenylmethane. Furthermore, the organolithium compound may be used in combination with an inorganic salt, such as lithium chloride, a lithium salt of an alkoxide, such as lithium 2-(2-methoxyethoxy)ethoxide, or an organoaluminum compound, such as diisobutyl(2,6-di-t-butyl-4-methylphenoxy)aluminum.

The polymerization solvent may be a hydrocarbon solvent, such as benzene, toluene, or xylene; a halogenated hydrocarbon solvent, such as chloroform, methylene chloride, or carbon tetrachloride; or an ether solvent, such as tetrahydrofuran or diethyl ether.

The acrylic adhesive resin containing an acrylic block copolymer may constitute 30% to 100% by mass, or 50% to 95% by mass, of the total adhesive resin used for an adhesive layer in one or more embodiments of the present invention.

Preferably an acrylic block copolymer, more preferably a triblock copolymer represented by the general formula (1), is contained as a main component of an adhesive resin for use in an adhesive layer in one or more embodiments of the present invention. An acrylic adhesive resin other than the triblock copolymers represented by the general formula (1) may be, but is not limited to, an acrylic adhesive resin or a rubber adhesive resin described below.

An acrylic adhesive resin other than the acrylic triblock copolymers described above is not particularly limited and can be appropriately selected for each purpose. For example, the acrylic adhesive resin contains an acrylic polymer and an optional additive agent, such as a tackifier resin or a cross-linker.

The acrylic polymer has a chemical structure other than the triblock copolymers represented by the general formula (1), and can be produced, for example, by polymerizing a (meth)acrylate monomer. The (meth)acrylate monomer may be, for example, an alkyl (meth)acrylate with an alkyl group having 1 to 12 carbon atoms.

A specific example of the alkyl (meth)acrylate with an alkyl group having 1 to 12 carbon atoms may be methyl (meth)acrylate, ethyl (meth)acrylate, n-butyl (meth)acrylate, isobutyl (meth)acrylate, t-butyl (meth)acrylate, n-hexyl (meth)acrylate, n-octyl (meth)acrylate, isooctyl (meth)acrylate, isononyl (meth)acrylate, cyclohexyl (meth)acrylate, or 2-ethylhexyl (meth)acrylate. These may be used alone or in combination.

The alkyl (meth)acrylate with an alkyl group having 1 to 12 carbon atoms may be an alkyl (meth)acrylate with an alkyl group having 4 to 12 carbon atoms, an alkyl (meth) acrylate with an alkyl group having 4 to 8 carbon atoms, or n-butyl acrylate in terms of high adhesiveness to an adherend.

The alkyl (meth)acrylate with an alkyl group having 1 to 12 carbon atoms may be used in the range of 0% to 50% by mass, or 0% to 30% by mass, of the total amount of monomer(s) used to produce the acrylic polymer.

A monomer that can be used to produce the acrylic polymer may be a polar vinyl monomer, if necessary, in addition to those described above.

The polar vinyl monomer is, for example, a (meth)acrylic monomer, such as a (meth)acrylic monomer with a hydroxy group, a (meth)acrylic monomer with a carboxy group, a (meth)acrylic monomer with an amide group, vinyl acetate, ethylene-oxide-modified succinic acid acrylate, or a monomer with a sulfonate group, such as 2-acrylamide-2-methylpropanesulfonic acid. These may be used alone or in combination.

Specific examples of a vinyl monomer with a hydroxy group include (meth)acrylic monomers, such as 2-hydroxyethyl (meth)acrylate, 2-hydroxypropyl (meth)acrylate, 4-hydroxybutyl (meth)acrylate, and 6-hydroxyhexyl (meth)acrylate.

The vinyl monomer with a hydroxy group may be used when an adhesive resin containing an isocyanate cross-linker is used. More specifically, the vinyl monomer with a hydroxy group may be 2-hydroxyethyl (meth)acrylate, 4-hydroxybutyl (meth)acrylate, or 6-hydroxyhexyl (meth)acrylate.

The vinyl monomer with a hydroxy group may be used in the range of 0.01% to 1.0% by mass, or 0.03% to 0.3% by mass, of the total amount of monomer(s) used to produce the acrylic polymer.

Specific examples of a vinyl monomer with a carboxy group include (meth)acrylic monomers, such as acrylic acid, methacrylic acid, itaconic acid, maleic acid, (meth)acrylic acid dimers, crotonic acid, and ethylene-oxide-modified succinic acid acrylates. Among these, acrylic acid is preferred.

Specific examples of a vinyl with an amide group include (meth)acrylic monomers, such as N-vinylpyrrolidone, N-vinylcaprolactam, acryloylmorpholine, acrylamide, and N,N-dimethylacrylamide.

The polar vinyl monomer may be used, with respect to the total amount of monomer(s) used to produce the acrylic polymer, in the range of 1.5% to 20% by mass, 1.5% to 10% by mass, or 2% to 8% by mass to form an adhesive layer balanced in terms of cohesive force, holding power, and adhesiveness.

The acrylic polymer may be produced by any method, which can be appropriately selected from known methods for each purpose, for example, by a method for polymerizing a monomer by a polymerization method, such as a solution polymerization method, a bulk polymerization method, a suspension polymerization method, or an emulsion polymerization method. Among these, the acrylic polymer may be produced by the solution polymerization method or the bulk polymerization method.

For the polymerization, a peroxide thermal polymerization initiator, such as benzoyl peroxide or lauroyl peroxide, an azo thermal polymerization initiator, such as azobisisobutyronitrile, an acetophenone photopolymerization initiator, a benzoin ether photopolymerization initiator, a benzilketal photopolymerization initiator, an acylphosphine oxide photopolymerization initiator, a benzoin photopolymerization initiator, a benzophenone photopolymerization initiator, or the like can be used as required.

An acrylic polymer produced by the method described above may have a weight-average molecular weight in the range of 300,000 to 3 million, or 500,000 to 2.5 million, as measured by gel permeation chromatography (GPC) on the basis of polystyrene standards by the same method under the same conditions as for a triblock copolymer.

An acrylic adhesive resin other than the acrylic triblock copolymers may constitute 0% to 40% by mass, or 0% to 1% by mass, of the total adhesive resin used for an adhesive layer in one or more embodiments of the present invention.

In an adhesive layer in one or more embodiments of the present invention, when the amount of the acrylic adhesive resin other than the acrylic triblock copolymers is in such a range, the initial adhesiveness is easily improved while maintaining repeelability and high-load holding power.

The rubber adhesive resin may be, but is not limited to, a rubber adhesive resin that contains a rubber material generally usable as an adhesive resin, such as a synthetic rubber adhesive resin or a natural rubber adhesive resin, and an optional additive agent, such as a tackifier resin.

The rubber material is, for example, a block copolymer of an aromatic vinyl compound and a conjugated diene compound, more specifically, a styrene resin, such as a styrene-isoprene copolymer, a styrene-isoprene-styrene copolymer, a styrene-isoprene-butadiene-styrene copolymer, a styrene-butadiene-styrene copolymer, a styrene-ethylene-butylene copolymer, a styrene-ethylene-propylene copolymer, or a hydrogenated product thereof. These may be used alone or in combination. Among these, two or more styrene resins may be used in combination because they can provide an adhesive tape with good adhesive physical properties and a high holding power, and a styrene-isoprene copolymer and a styrene-isoprene-styrene copolymer may be used in combination.

The styrene resin may be, for example, a resin with a single structure, such as a linear structure, a branched structure, or a multi-branched structure, or a resin with a combination of different structures. When a styrene resin rich in a linear structure is used for the adhesive layer, the adhesive tape can have high adhesive performance. On the other hand, a styrene resin with a branched structure or a multi-branched structure and with a styrene block at a molecular end can have a pseudo-cross-linked structure, can provide high cohesive force, and can therefore provide a high holding power. Thus, styrene resins may be used in combination depending on necessary characteristics.

The styrene resin may have a structural unit represented by the following chemical formula (B) in the range of 10% to 80% by mass, 12% to 60% by mass, 15% to 40% by mass, or 17% to 35% by mass, of the total mass of the styrene resin. This can provide high adhesiveness and heat resistance.

[Chem. 9]

(B)

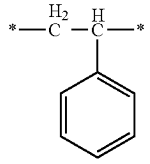

The rubber adhesive resin may constitute 0% to 50% by mass, or 0% to 30% by mass, of the total adhesive resin used for an adhesive layer in one or more embodiments of the present invention.

In an adhesive layer in one or more embodiments of the present invention, at a rubber adhesive resin content in such a range, adhesiveness, disassemblability, and high-load holding power can be easily satisfied.

<<Aromatic Vinyl Adhesive Resin Containing Styrene Block Copolymer>>

An aromatic vinyl adhesive resin containing a styrene block copolymer that may be used as a main component of the adhesive resin may be, but is not limited to, one that contains a rubber material generally usable as an adhesive resin, such as a synthetic rubber adhesive resin or a natural rubber adhesive resin, and an optional additive agent, such as a tackifier resin.

An aromatic vinyl adhesive resin other than the styrene block copolymers may contain, for example, a block copolymer of a monovinyl-substituted aromatic compound and a conjugated diene compound as a base polymer. The monovinyl-substituted aromatic compound refers to a compound having one functional group with a vinyl group bonded to an aromatic ring. A typical example of the aromatic ring may be a benzene ring (which may be a benzene ring substituted with a functional group with no vinyl group (for example, an alkyl group)). Specific examples of the monovinyl-substituted aromatic compound include styrene, α-methylstyrene, vinyltoluene, and vinylxylene. Specific examples of the conjugated diene compound include 1,3-butadiene and isoprene. Such block copolymers can be used alone or in combination for the base polymer.

In an A segment (hard segment) in the block copolymer, the copolymerization ratio of the monovinyl-substituted aromatic compound (two or more types may be used in combination) is preferably 70% or more by mass (more preferably 90% or more by mass, and may be substantially 100% by mass). In a B segment (soft segment) in the block copolymer, the copolymerization ratio of the conjugated diene compound (two or more types may be used in combination) is preferably 70% or more by mass (more preferably 90% or more by mass, and may be substantially 100% by mass). Such a block copolymer can provide an adhesive tape with higher performance.

The block copolymer may be a diblock form, a triblock form, a radial form, or a mixture thereof. The triblock form and the radial form may have an A segment (for example, a styrene block) at an end of the polymer chain. This is because the A segment at an end of the polymer chain tends to aggregate and form a domain, thereby forming a pseudo-cross-linked structure and improving the aggregability of the adhesive agent. A block copolymer in the technique disclosed herein can preferably be a block copolymer, for example, with a diblock form ratio of 30% or more by mass (more preferably 40% or more by mass, still more preferably 50% or more by mass, particularly preferably 60% or more by mass, typically 65% or more by mass, for example, 70% or more by mass) in terms of adhesion (peeling strength) to an adherend and resistance to resilience. Furthermore, from the perspective of resistance to continuously applied stress, a block copolymer with a diblock form ratio of 90% or less by mass (more preferably 85% or less by mass, for example, 80% or less by mass) can preferably be used. For example, a block copolymer with a diblock form ratio in the range of 60% to 85% by mass is preferably used.

In a styrene block copolymer in one or more embodiments of the present invention, the base polymer is a styrene block copolymer. For example, the base polymer contains at least one of a styrene-isoprene block copolymer and a styrene-butadiene block copolymer. Among the styrene block copolymers in the adhesive resin, preferably, a styrene-isoprene block copolymer constitutes 70% or more by mass, a styrene-butadiene block copolymer constitutes 70% or more by mass, or a styrene-isoprene block copolymer and a styrene-butadiene block copolymer constitute 70% or more by mass. In a preferred embodiment, substantially all (for example, 95% to 100% by mass) of the styrene block copolymers is a styrene-isoprene block copolymer. In another preferred embodiment, substantially all (for example, 95% to 100% by mass) of the styrene block copolymers is a styrene-butadiene block copolymer. Such a composition can suitably provide an adhesive tape with high resistance to resilience and a good balance with other adhesive properties.

The styrene block copolymer may be a diblock form, a triblock form, a radial form, or a mixture thereof. The triblock form and the radial form may have a styrene block at an end of the polymer chain. This is because the styrene block at an end of the polymer chain tends to aggregate and form a styrene domain, thereby forming a pseudo-cross-linked structure and improving the aggregability of the adhesive agent. A styrene block copolymer for use in the technique disclosed herein can preferably be a styrene block copolymer, for example, with a diblock form ratio of 30% or more by mass (more preferably 40% or more by mass, still more preferably 50% or more by mass, particularly preferably 60% or more by mass, typically 65% or more by mass) in terms of adhesion (peeling strength) to an adherend and resistance to resilience. It may be a styrene block copolymer with a diblock form ratio of 70% or more by mass (for example, 75% or more by mass). From the perspective of holding power or the like, a styrene block copolymer with a diblock form ratio of 90% or less by mass (more preferably 85% or less by mass, for example, 80% or less by mass) can preferably be used. For example, a styrene block copolymer with a diblock form ratio in the range of 60% to 85% by mass may be used.

The styrene block copolymer may have a styrene content in the range of 5% to 40% by mass, for example. From the perspectives of resistance to resilience and holding power, a styrene block copolymer with a styrene content of 10% or more by mass (more preferably more than 10% by mass, for example, 12% or more by mass) is usually preferred. From the perspective of adhesion to an adherend, a styrene block copolymer with a styrene content of 35% or less by mass (typically 30% or less by mass, more preferably 25% or less by mass, for example, less than 20% by mass) is preferred. For example, a styrene block copolymer with a styrene content of 12% or more by mass and less than 20% by mass may be used.

The aromatic vinyl adhesive resin containing a styrene block copolymer may constitute 50% to 100% by mass, or 50% to 100% by mass, of the total adhesive resin used for an adhesive layer in one or more embodiments of the present invention.

In an adhesive layer in one or more embodiments of the present invention, when the amount of the aromatic vinyl adhesive resin containing a styrene block copolymer is 50% or more by mass, repeelability and high-load holding power can be easily maintained. On the other hand, when the amount of the acrylic adhesive resin containing an acrylic block copolymer is 50% or more by mass, repeelability and high-load holding power can be easily maintained.

An adhesive resin for use in an adhesive layer in one or more embodiments of the present invention may contain a styrene block copolymer as a main component. The aromatic vinyl adhesive resin other than the styrene block copolymer is not particularly limited and may include the acrylic adhesive resin or the rubber adhesive resin described above.

<<Tackifier Resin>>

The adhesive layer in the present disclosure contains a tackifier resin. The tackifier resin may be used to improve adhesiveness and surface adhesion strength to an adherend.

The tackifier resin in the present disclosure may have a softening point of 95° C. or more. More preferably, the softening point ranges from 95° C. to 180° C., still more preferably 95° C. to 140° C. to form an adhesive layer with high adhesive performance. When a (meth)acrylate tackifier resin is used, the glass transition temperature thereof preferably ranges from 30° C. to 200° C., more preferably 50° C. to 160° C.

Specific examples of the tackifier resin include rosin tackifier resins, polymerized rosin tackifier resins, polymerized rosin ester tackifier resins, rosin phenolic tackifier resins, stabilized rosin ester tackifier resins, disproportionated rosin ester tackifier resins, hydrogenated rosin ester tackifier resins, terpene tackifier resins, terpene phenolic tackifier resins, petroleum resin tackifier resins, and (meth) acrylate tackifier resins. These may be used alone or in combination. Among these, the tackifier resin may be a polymerized rosin ester tackifier resin, a rosin phenolic tackifier resin, a disproportionated rosin ester tackifier resin, a hydrogenated rosin ester tackifier resin, a terpene phenolic resin, or a (meth)acrylate resin.

Specific examples of the rosin tackifier resins include unmodified rosins (raw rosins), such as gum rosin, wood rosin, and tall oil rosin; modified rosins produced by modifying these unmodified rosins by hydrogenation, disproportionation, polymerization, or the like (hydrogenated rosins, disproportionated rosins, polymerized rosins, and other chemically modified rosins, the same applies to the following); and various other rosin derivatives. Examples of the rosin derivatives include rosin esters, such as unmodified rosins esterified with an alcohol (that is, esterified products of rosins) and modified rosins esterified with an alcohol (that is, esterified products of modified rosins); unsaturated fatty acid modified rosins produced by modifying an unmodified rosin or a modified rosin with an unsaturated fatty acid; unsaturated fatty acid modified rosin esters produced by modifying a rosin ester with an unsaturated fatty acid; rosin alcohols produced by reducing a carboxy group in an unmodified rosin, modified rosin, unsaturated fatty acid modified rosin, or unsaturated fatty acid modified rosin ester; metal salts of rosins (particularly rosin esters), such as unmodified rosins, modified rosins, and various rosin derivatives; and rosin phenolic resins produced by adding phenol to rosins (unmodified rosins, modified rosins, various rosin derivatives, and the like) using an acid catalyst followed by thermal polymerization. When an acrylic polymer is used as a base polymer, a rosin tackifier resin may be used. To improve adhesive properties, such as adhesive strength, among the rosin tackifier resins, two or three or more rosin tackifier resins of different types or characteristics (for example, softening points) rosin used in combination.

Examples of the terpene tackifier resins include terpene resins, such as α-pinene polymers, β-pinene polymers, and dipentene polymers; and modified terpene resins produced by modifying these terpene resins (phenolic modification, aromatic modification, hydrogenation modification, hydrocarbon modification, or the like). Examples of the modified terpene resins include terpene-modified phenolic resins, styrene-modified terpene resins, aromatic modified terpene resins, and hydrogenated terpene resins. When an acrylic polymer is used as a base polymer, a terpene tackifier resin (for example, a terpene modified phenolic resin) may be used. In particular, to improve adhesive properties, such as adhesive strength, among the terpene tackifier resins (for example, terpene modified phenolic resins), one or two or more terpene tackifier resins of different types or characteristics (for example, softening points) may be used in combination.

Examples of hydrocarbon tackifier resins include various hydrocarbon resins, such as aliphatic hydrocarbon resins, aromatic hydrocarbon resins, aliphatic cyclic hydrocarbon resins, aliphatic/aromatic petroleum resins (styrene-olefin copolymers and the like), aliphatic/alicyclic petroleum resins, hydrogenated hydrocarbon resins, coumarone resins, and coumarone-indene resins.

The tackifier resin can preferably be a tackifier resin with a softening point (softening temperature) of 95° C. or more. An adhesive agent containing a tackifier resin with a softening point equal to or higher than the lower limit can provide an adhesive tape with higher adhesive strength. Among the tackifier resins exemplified above, terpene tackifier resins (for example, terpene-modified phenolic resins) and rosin tackifier resins (for example, esterified products of polymerized rosins) with the softening point described above can preferably be used. The upper limit of the softening point of the tackifier resin may be, but is not limited to, approximately 200° C. or less. The softening point of the tackifier resin is defined as a value measured by a softening point test method (a ring-and-ball method) specified in JIS K 5902 or JIS K 2207.

The amount of the tackifier resin to be used is not particularly limited and can be appropriately selected for each purpose, and preferably ranges from 5 to 65 parts by mass, more preferably 8 to 55 parts by mass, per 100 parts by mass of the adhesive resin, to easily ensure adhesiveness to an adherend.

The adhesive resin containing an acrylic block copolymer or a styrene block copolymer in the present disclosure may contain a cross-linker to further improve the cohesive force of the adhesive layer.

The cross-linker is not particularly limited and can be appropriately selected for each purpose. For example, the cross-linker is an isocyanate cross-linker, an epoxy cross-linker, a metal chelate cross-linker, or an aziridine cross-linker. These may be used alone or in combination. Among these, the cross-linker may be a cross-linker that is mixed after the production of an acrylic polymer to promote a cross-linking reaction, or an isocyanate cross-linker or an epoxy cross-linker with high reactivity with an acrylic polymer.

The isocyanate cross-linker is, for example, tolylene diisocyanate, triphenylmethane isocyanate, naphthylene-1, 5-diisocyanate, hexamethylene diisocyanate, diphenylmethane diisocyanate, xylylene diisocyanate, or trimethylolpropane-modified tolylene diisocyanate. These may be used alone or in combination. Among these, trifunctional polyisocyanate compounds: tolylene diisocyanate, trimethylolpropane adducts thereof, and triphenylmethane isocyanate are particularly preferred.

In the present description, a gel fraction obtained by measuring insoluble matter after an adhesive layer is immersed in toluene for 24 hours is used as a measure of the degree of cross-linking. The adhesive layer may have any gel fraction, which can be appropriately selected for each purpose and preferably ranges from 10% to 70% by mass, more preferably 25% to 65% by mass, still more preferably 35% to 60% by mass to form an adhesive layer with high aggregability and adhesiveness.

The gel fraction refers to a value measured by the following method. An adhesive composition containing an adhesive resin and an optional additive agent is applied to a release sheet such that the thickness after drying is 50 μm, is dried at 100° C. for 3 minutes, is aged at 40° C. for 2 days, and is cut into a 50-mm square piece as a sample. Next, the mass (G1) of the sample before toluene immersion is measured in advance. Toluene insoluble matter of the sample after immersion in the toluene solution at 23° C. for 24 hours is separated by filtration through a 300-mesh screen. The mass (G2) of a residue after drying at 110° C. for 1 hour is measured. The gel fraction is determined using the following formula (4). The mass (G3) of electrically conductive fine particles in the sample is calculated from the mass (G1) of the sample and the composition of the adhesive composition.

$$\text{Gel fraction (\% by mass)}=(G2-G3)/(G1-G3)\times 100 \quad \text{Mathematical formula (4)}$$

Another component in the adhesive layer in the present disclosure is not particularly limited and can be appropriately selected within the scope of not impairing the characteristics of the adhesive tape, and is, for example, a polymer component other than the adhesive resin, an additive agent, such as a cross-linker, an age resister, an ultraviolet absorber, a filler, a polymerization inhibitor, a surface conditioner, an antistatic agent, an antifoaming agent, a viscosity modifier, a light stabilizer, a weathering stabilizer, a heat stabilizer, an antioxidant, a leveling agent, an organic pigment, an inorganic pigment, a pigment dispersant, a plasticizer, a softener, a flame retardant, a metal deactivator, silica beads, or organic beads; or an inorganic filler, such as silicon oxide, aluminum oxide, titanium oxide, zirconia, or antimony pentoxide. These may be used alone or in combination.

The other component content of the adhesive layer in the present disclosure can be appropriately selected within the scope of not impairing the characteristics of the adhesive tape.

<Filler>

The adhesive layer of the adhesive tape according to the present disclosure may contain a filler, a tackifier resin, and an adhesive resin.

In the present disclosure, an adhesive composition serving as a precursor of the adhesive layer may contain a filler. When the adhesive composition serving as a precursor of the adhesive layer contains the filler, the filler is exposed from the adhesive layer when the adhesive tape is stretched, and thereby reduces the adhesion area between the adhesive layer and an adherend. Thus, the adhesive tape can be more easily and more quickly peeled off even when the adhesive tape is stretched at a relatively large angle, for example, in the vertical direction (sometimes referred to as a "90-degree direction"), with respect to the attaching surface of an adherend (hereinafter sometimes referred to as the "bonding surface") or even when the adhesive tape is stretched at a high speed.

The filler may be of any type, can be appropriately selected without losing the advantages of one or more embodiments of the present invention, and may be an inorganic filler or an organic filler. These may be used alone or in combination.

Specific examples of the inorganic filler include aluminum hydroxide, magnesium hydroxide, aluminum oxide, silicon oxide, magnesium oxide, zinc oxide, titanium oxide, zirconium oxide, iron oxide, silicon carbide, boron nitride, aluminum nitride, titanium nitride, silicon nitride, titanium boride, carbon, nickel, copper, aluminum, titanium, gold, silver, zirconium hydroxide, basic magnesium carbonate, dolomite, hydrotalcite, calcium hydroxide, barium hydroxide, tin oxide, hydrate of tin oxide, borax, zinc borate, zinc metaborate, barium metaborate, zinc carbonate, magnesium-calcium carbonate, calcium carbonate, barium carbonate, molybdenum oxide, antimony oxide, red phosphorus, mica, clay, kaolin, talc, zeolite, wollastonite, smectite, silica (quartz, fumed silica, precipitated silica, silicic anhydride, fused silica, crystalline silica, ultrafine amorphous silica, etc.), potassium titanate, magnesium sulfate, sepiolite, xonotlite, aluminum borate, barium sulfate, barium titanate, zirconium oxide, cerium, tin, indium, carbon, sulfur, tellurium, cobalt, molybdenum, strontium, chromium, barium, lead, tin oxide, indium oxide, diamond, magnesium, platinum, zinc, manganese, and stainless steel. Among these, aluminum hydroxide and nickel are preferred.

The inorganic filler may be subjected to surface treatment, such as silane coupling treatment or stearic acid treatment, to improve dispersibility in the adhesive resin.

Specific examples of the organic filler include polystyrene filler, benzoguanamine filler, polyethylene filler, polypropylene filler, silicone filler, urea-formalin filler, a styrene/methacrylic acid copolymer filler, fluorinated filler, acrylic filler, polycarbonate filler, polyurethane filler, polyamide filler, epoxy resin filler, and thermosetting resin hollow filler.

Among these organic fillers, the silicone filler may be more specifically silicone rubber particles produced by three dimensionally cross-linking linear organopolysiloxane (see Japanese Unexamined Patent Application Publication No. 63-77942, No. 3-93834, and No. 04-198324) and powdered silicone rubber (see U.S. Pat. No. 3,843,601, Japanese Unexamined Patent Application Publication No. 62-270660, and Japanese Unexamined Patent Application Publication No. 59-96,122). It is also possible to use silicone composite particles with a structure in which the surface of silicone rubber particles produced by the method described above is covered with a silicone resin that is a polyorganosilsesquioxane cured product with a three-dimensional network cross-linked structure represented by $(R'SiO_{3/2})_n$ (R' denotes a substituted or unsubstituted monovalent hydrocarbon group) (see Japanese Unexamined Patent Application Publication No. 7-196815).

Such silicone particles may be Trefil E-500, Trefil E-600, Trefil E-601, and Trefil E-850 (trade names) commercially available from Dow Corning Toray Silicone Co., Ltd., and KMP-600, KMP-601, KMP-602, and KMP-605 commercially available from Shin-Etsu Chemical Co., Ltd.

Another silicone filler may be acrylic-modified silicone particles. The acrylic-modified silicone particles may be an emulsion graft polymer of a polyorganosiloxane represented by the following general formula (C), an acrylic acid ester monomer and/or a methacrylic acid ester monomer, and a monomer with a functional group copolymerizable therewith.

[Chem. 10]

(C)

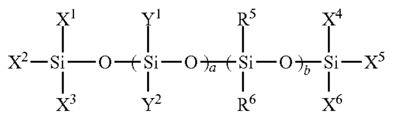

(In the general formula (C), $R^5$ and $R^6$ independently denote a substituted or unsubstituted alkyl group having 1 to 20 carbon atoms or an aryl group having 6 to 20 carbon atoms, $X^1$, $X^2$, $X^3$, $X^4$, $X^5$, and $X^6$ independently denote a substituted or unsubstituted alkyl group having 1 to 20 carbon atoms, an aryl group having 6 to 20 carbon atoms, an alkoxy group having 1 to 20 carbon atoms, or a hydroxy group, $Y^1$ and $Y^2$ independently denote a group represented by $X^1$ or $—[O—Si(X^7)(X^8)]_c—X^9$, wherein $X^7$, $X^8$, and $X^9$ independently denote a substituted or unsubstituted alkyl group having 1 to 20 carbon atoms, an aryl group having 6 to 20 carbon atoms, an alkoxy group having 1 to 20 carbon atoms, or a hydroxy group, at least two groups of $X^1$, $X^2$, $X^3$, $X^4$, $X^5$, $X^6$, $X^7$, $X^8$, and $X^9$ and $Y^1$ and $Y^2$ denote a hydroxy group, and a, b and c independently denote a positive number in the range of $0 \leq a \leq 1{,}000$, a positive number in the range of $100 \leq b \leq 10{,}000$, and a positive number in the range of $1 \leq c \leq 1{,}000$, respectively.)

In the general formula (C), an alkyl group having 1 to 20 carbon atoms represented by $R^5$ or $R^6$ may be linear, branched, or cyclic. Specific examples thereof include a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group, a cyclopentyl group, a cyclohexyl group, and a cycloheptyl group. These alkyl groups may be substituted with a halogen atom, an acryloxy group, a methacryloxy group, a carboxy group, an alkoxy group, an alkenyloxy group, an amino group, or an alkyl-, alkoxy-, or (meth)acryloxy-substituted amino group.

The aryl group having 6 to 20 carbon atoms represented by $R^5$ or $R^6$ may be a phenyl group, a tolyl group, or a naphthyl group.

$R^5$ or $R^6$ may denote a methyl group.

In the general formula (C), the alkyl group having 1 to 20 carbon atoms and the aryl group having 6 to 20 carbon atoms represented by $X^1$ to $X^9$ may be the same as the alkyl group and the aryl group exemplified for $R^5$ or $R^6$, respectively.

The alkoxy group having 1 to 20 carbon atoms represented by $X^1$ to $X^9$ may be a methoxy group, an ethoxy group, a propoxy group, a butoxy group, a hexyloxy group, a heptyloxy group, an octyloxy group, a decyloxy group, or a tetradecyloxy group.

In the general formula (C), a, b, and c denote a positive number in the range of $0 \leq a \leq 1{,}000$, a positive number in the range of $100 \leq b \leq 10{,}000$, and a positive number in the range of $1 \leq c \leq 1{,}000$, and a preferably denotes a positive number in the range of 0 to 200. When a is more than 1,000, the resulting film has insufficient strength. Preferably, b denotes a positive number in the range of 1,000 to 5,000. When b is less than 100, the film is less flexible. When b is more than 10,000, a solid, like particles, is difficult to form. Preferably, c denotes a positive number in the range of 1 to 200.

A polyorganosiloxane represented by the general formula (C) has at least 2, preferably 2 to 4, hydroxy groups per molecule preferably at both ends of the molecular chain in terms of cross-linking properties.

The acrylic acid ester monomer or the methacrylic acid ester monomer may be methyl acrylate, ethyl acrylate, isopropyl acrylate, n-butyl acrylate, methyl methacrylate, ethyl methacrylate, isopropyl methacrylate, or cyclohexyl methacrylate.

The monomer with a functional group copolymerizable with the acrylic acid ester monomer and/or the methacrylic acid ester monomer may be a monomer with an unsaturated bond including a carboxy group, an amide group, a hydroxy group, a vinyl group, an allyl group, or the like.

The acrylic-modified silicone powder may be produced by mixing 100 parts by mass of a polyorganosiloxane represented by the general formula (4), 10 to 100 parts by mass of an acrylate monomer and/or a methacrylate monomer, and 0.01 to 20 parts by mass of a monomer with a functional group copolymerizable therewith followed by emulsion graft polymerization. The conditions for the emulsion graft polymerization are not particularly limited, and an initiator used for the polymerization may be a known radical initiator usually used for acrylic polymers. A known anionic surfactant or nonionic surfactant may be used as an emulsifier.

The acrylic-modified silicone particles are granulated and powdered by a method described below. Spray drying, air drying, or the like may be used. A spray dryer is preferred in terms of productivity. The powdering is preferably hot drying preferably in the range of 80° C. to 150° C.

The acrylic-modified silicone particles may be, for example, a commercial product, such as Chaline R-1705 or Chaline R-200 (manufactured by Nissin Chemical Industry Co., Ltd.).

The filler in the present disclosure may have any shape, which can be appropriately selected for each purpose and may be a regular or irregular shape. Specific examples of the shape of the filler include polygonal, cubic, elliptical, spherical, acicular, flat, and flaky. Fillers in these shapes may be used alone or in combination. Fillers in these shapes may aggregate. Among these, the shape of the filler may be elliptical, spherical, or polygonal. When the filler shape is elliptical, spherical, polygonal, or the like, the adhesive layer slides well on an adherend when the adhesive tape is stretched, and the adhesive tape can be more easily and more quickly peeled off.

The filler in the present disclosure may have any particle size distribution (D90/D10), which can be appropriately selected for each purpose, preferably ranges from 2.5 to 20, and more preferably ranges from 2.5 to 15, still more preferably 2.5 to 5, in terms of impact resistance. When the particle size distribution (D90/D10) of the filler is in a preferred range, the adhesive tape can be more easily and more quickly peeled off, and even an adhesive tape with a thin substrate is rarely broken and has high impact resistance, shear strength, and cleavage strength. On the other hand, when the particle size distribution (D90/D10) of the filler is less than 2.5, stretch peelability may deteriorate. When the particle size distribution (D90/D10) of the filler is more than 20, the adhesive performance, such as impact resistance, shear strength, or cleavage strength, may deteriorate.

The particle size distribution (D90/D10) of the filler in the present disclosure can be determined, for example, by measuring the average particle size of the filler with a measuring machine using a laser diffraction scattering method (Microtrac) and converting the average particle size into a particle size distribution.

The filler in the present disclosure has an average particle size in the range of 0.1 to 40 μm, preferably 5 to 40 μm, more preferably 10 to 35 μm, still more preferably 10 to 30 μm, particularly preferably 10 to 25 μm. When the average particle size of the filler is in a preferred range, the adhesive tape can be more easily and more quickly peeled off, and even an adhesive tape with a thin substrate is rarely broken and has high impact resistance, shear strength, and cleavage strength. On the other hand, when the particle size of the filler is less than 0.1 μm, stretch peelability may deteriorate. When the particle size of the filler is more than 40 μm, the adhesive performance, such as impact resistance, shear strength, or cleavage strength, may deteriorate.

The average particle size of the filler in the present disclosure refers to the volume-average particle size and can be measured, for example, with a measuring machine using the laser diffraction scattering method (Microtrac).

When the silicone rubber particles or silicone composite particles are used as the filler in the present disclosure, the silicone rubber particles or silicone composite particles may have an average particle size in the range of 0.1 to 40 μm, or 5 to 40 μm. An average particle size of less than 0.1 μm tends to result in the filler with a smaller effect of reducing the adhesion area when the adhesive tape is stretched. An average particle size of more than 40 μm tends to result in the adhesive tape with lower adhesive strength.

When the acrylic-modified silicone particles are used as the filler in the present disclosure, the acrylic-modified silicone particles may have an average particle size in the range of 0.1 to 40 μm, 5 to 40 μm, 5 to 30 μm, or 10 to 25 μm. An average particle size of less than 0.1 μm tends to result in the filler with a smaller effect of reducing the adhesion area when the adhesive tape is stretched. An average particle size of more than 40 μm tends to result in the adhesive tape with lower adhesive strength.

The ratio of the average particle size of the filler to the average thickness of the adhesive layer in the present disclosure is not particularly limited and can be appropriately selected for each purpose. The ratio of the average particle size of the filler to the average thickness of the adhesive layer represented by [the volume-average particle size of the filler/the average thickness of the adhesive layer] may be 5/100 or more, 5/100 to 95/100, 10/100 to 75/100, or 20/100 to 60/100. When the ratio is 5/100 or more, the adhesive tape can be more easily and more quickly peeled off, and even an adhesive tape with a thin substrate is rarely broken. Furthermore, it is advantageous in that the ratio is 95/100 or less and in terms of higher adhesive performance, such as impact resistance, shear strength, or cleavage strength.

The filler content of the adhesive layer in the present disclosure preferably ranges from 0% to 300% by mass, more preferably 1% to 100% by mass, preferably 10% to 70% by mass, more preferably 20% to 50% by mass, per 100% by mass of the adhesive resin. When the filler content is 1% or more by mass per 100% by mass of the adhesive resin, the adhesive tape can be more easily and more quickly peeled off. When the filler content is 50% or less by mass per 100% by mass of the adhesive resin, it is possible to prevent the adhesive composition from remaining on an adherend or prevent a decrease in impact resistance or a decrease in shear strength or cleavage strength.

The filler content of the adhesive layer in the present disclosure can be appropriately adjusted when an adhesive composition serving as a precursor of the adhesive layer is prepared.

When the silicone rubber particles or silicone composite particles are used as the filler, the silicone rubber particle or silicone composite particle content preferably ranges from 20% to 70% by mass per 100% by mass of the adhesive layer.

When the acrylic-modified silicone particles are used as the filler, the acrylic-modified silicone particle content preferably ranges from 20% to 70% by mass per 100% by mass of the adhesive layer.

The ratio of the volume of the filler to the total volume of the adhesive layer in the present disclosure preferably ranges from 4% to 40%, more preferably 5% to 30%, still more preferably 5% to 20%, most preferably 5% to 15%. When the volume ratio of the filler is 4% or more, the adhesive tape can be more easily and more quickly peeled off. When the volume ratio of the filler is 40% or less, it is possible to prevent the adhesive layer from remaining on an adherend or prevent a decrease in impact resistance or a decrease in shear strength or cleavage strength.

The volume ratio of the filler to the adhesive layer can be calculated using the following mathematical formulae (1) to (3).

Mass $A$ (g) of adhesive resin*1/density $A$ (g/cm$^3$) of adhesive resin*1=volume $A$ (cm$^3$) of adhesive resin*1 mathematical formula (1)

Mass $B$ (g) of filler/density $B$ (g/cm$^3$) of filler=volume $B$ (cm$^3$) of filler mathematical formula (2)

Volume $B$ (cm$^3$) of filler/(volume $A$ (cm$^3$) of adhesive resin*1+volume $B$ (cm$^3$) of filler)×100=volume ratio (%) of filler mathematical formula (3)

In the mathematical formulae (1) and (3), the adhesive resin marked with *1 may contain another component described later. The density is a value measured in accordance with JIS Z 8804.

The adhesive tape according to the present disclosure may have one or two or more other layers depending on the purpose. The other layers are, for example, a primer layer, an antistatic layer, a noncombustible layer, a decorative layer, an electrically conductive layer, a thermally conductive layer, and a release layer.

The adhesive tape according to the present disclosure may have any shape and dimensions as long as the adhesive tape includes a substrate layer and an adhesive layer on at least one surface of the substrate layer. For example, the adhesive tape is an adhesive tape with a shape and dimensions suitable for bonding to a predetermined adherend (for example, an adhesive tape after punching) or a long sheet-like adhesive tape (for example, an adhesive tape before being processed in a particular shape).

The adhesive tape according to the present disclosure may have a nonadhesive holding region, for example, for bonding to or peeling from an adherend.

The adhesive tape may have any (average) thickness, which can be appropriately selected depending on the (average) thickness of the adhesive layer and the substrate layer and preferably ranges from 15 to 800 μm, more preferably 30 to 540 μm, still more preferably 60 to 320 μm, particularly preferably 70 to 250 μm.

The phrase "the thickness of the adhesive tape", as used herein, refers to the average thickness at a total of 25 positions determined by cutting the adhesive tape at 5 positions in the width direction at intervals of 100 mm in the longitudinal direction and measuring the thickness of the adhesive layer in each section at 5 positions at intervals of 100 mm in the width direction using the TH-104 paper/film thickness meter (manufactured by Tester Sangyo Co., Ltd.).

The adhesive tape may have any hardness (type A hardness (Shore A hardness)), which can be appropriately selected for each purpose and preferably ranges from 10 to 90, more preferably 20 to 85, still more preferably 64 to 85. When the Shore A hardness of the adhesive tape is in such a preferred range, this facilitates re-peeling work of peeling the adhesive tape. On the other hand, an adhesive tape with a Shore A hardness of less than 10 may be broken when stretched and peeled off. An adhesive tape with a Shore A hardness of more than 90 may not be re-peeled due to too high stretching stress when stretched and re-peeled off.

The rubber hardness of the adhesive tape is Shore A hardness, which is measured with a durometer (spring type rubber hardness tester) (model: GS-719G, manufactured by Teclock) in accordance with JIS K 6253.

The adhesive tape may have a stress at 25% elongation in the range of 0.15 to 82 MPa, 0.16 to 10 MPa, 0.17 to 5 MPa, or 0.18 to 4.5 MPa. When the stress at 25% elongation of the adhesive tape ranges from 0.15 to 82 MPa, the adhesive tape can have suitable adhesive strength and can be relatively easily peeled off when stretched and peeled off. On the other hand, when the stress at 25% elongation of the adhesive tape is less than 0.15 MPa, the adhesive tape may be peeled off by loading in a shear direction of the adhesive tape while hard adherends are fixed together. When the stress at 25% elongation of the adhesive tape is more than 82 MPa, the force required to stretch and peel off the adhesive tape tends to be excessive.

The stress at 25% elongation of the adhesive tape is measured by punching the adhesive tape into a dumbbell with a gauge length of 20 mm and a width of 5 mm, pulling the adhesive tape in a measurement atmosphere of 23° C. and 50% RH using a Tensilon tensile tester (model: RTF-1210, manufactured by A&D Company, Limited) at a crosshead speed of 500 mm/min in the longitudinal direction, and measuring the stress at 25% elongation.

The adhesive tape may have any breaking stress, which can be appropriately selected for each purpose and preferably ranges from 10 to 100.0 MPa, more preferably 15 to 90.0 MPa, still more preferably 30 to 90.0 MPa, particularly preferably 40 to 90.0 MPa. An adhesive tape with a breaking stress in such a preferred range is less likely to be broken when quickly stretched and peeled off, and the load to stretch the adhesive tape is not excessive. This facilitates re-peeling work of peeling off the adhesive tape. On the other hand, an adhesive tape with a breaking stress of less than 10 MPa may be broken when quickly stretched and peeled off, and an adhesive tape with a breaking stress of more than 100.0 MPa may not be sufficiently stretched and re-peeled off when stretched and re-peeled off. The force required to stretch and change the shape of the adhesive tape also depends on the thickness of the adhesive tape. For example, when a thick adhesive tape with high breaking stress is stretched and re-peeled off, the adhesive tape may not be sufficiently stretched and re-peeled off.

The breaking stress of the adhesive tape is measured by punching the adhesive tape into a dumbbell with a gauge length of 20 mm and a width of 5 mm, pulling the substrate layer in a measurement atmosphere of 23° C. and 50% RH using a Tensilon tensile tester (model: RTF-1210, manufactured by A&D Company, Limited) at a crosshead speed of 500 mm/min in the longitudinal direction, and measuring the stress at break.

The adhesive tape may have any elongation at break, which can be appropriately selected for each purpose and preferably ranges from 400% to 2000%, more preferably 500% to 1800%, still more preferably 600% to 1200%. If the elongation at break of the adhesive tape is 400% or more, even when the adhesive tape adheres strongly to an adherend, the stress to stretch the adhesive tape in the horizontal to vertical direction with respect to the attaching surface of the adherend is not excessive when the adhesive tape is re-peeled off, and the adhesive tape can be easily peeled off without being excessively stretched when peeled off. If the elongation at break is 2000% or less, the stretching distance in the horizontal to vertical direction with respect to an attaching surface of an adherend is not too long when the adhesive tape is re-peeled off, and work in a small space is possible. On the other hand, if the elongation at break is less than 500%, when the adhesive tape is re-peeled off, the adhesive tape may not be peeled off due to breakage when stretched and peeled off in the horizontal to vertical direction with respect to an attaching surface of an adherend. If the elongation at break is more than 1300%, when the adhesive tape is re-peeled off, this may result in poor workability due to a too long stretching distance in the horizontal to vertical direction with respect to an attaching surface of an adherend.

The elongation at break of the adhesive tape is measured by punching the adhesive tape into a dumbbell with a gauge length of 20 mm and a width of 5 mm, pulling the substrate layer in a measurement atmosphere of 23° C. and 50% RH using a Tensilon tensile tester (model: RTF-1210, manufactured by A&D Company, Limited) at a crosshead speed of 500 mm/min in the longitudinal direction, and measuring the tensile elongation percentage at break.

The adhesive tape may have a storage modulus G' (23° C.) in the range of $1.0\times10^4$ to $1.0\times10^8$ Pa, $5.0\times10^4$ to $5.0\times10^7$ Pa, $1.0\times10^5$ to $1.0\times10^7$ Pa, or $3.0\times10^5$ to $8.0\times10^6$ Pa. An adhesive tape with a breaking point stress in such a range can easily follow the distortion of an adherend, easily have high adhesive strength, have dimensional stability, and therefore have suitable attaching workability. As described above, for an adhesive tape according to one or more embodiments of the present invention, the adherend may also be a hard material, such as metal or plastic, with a large area. In general, an adherend with a larger area is more difficult to form with less distortion. An adhesive tape with a storage modulus in the range described above can follow the distortion of an adherend and can have suitable adhesive strength.

The adhesive tape may have any 180-degree peel adhesive strength, which can be appropriately selected for each purpose and preferably ranges from 3 N/20 mm to 50 N/20 mm, more preferably 10 N/20 mm to 50 N/20 mm, still more preferably 15 N/20 mm to 45 N/20 mm. When the 180-degree peel adhesive strength is in such a preferred range, the adhesive tape can have appropriate adhesive strength without peeling or slippage from an adherend and can be easily peeled off when stretched and re-peeled in the horizontal to vertical direction with respect to the attaching surface of the adherend.

The 180-degree peel adhesive strength of an adhesive tape refers to a value measured in accordance with JIS Z 0237.

The adhesive tape according to the present disclosure may have an initial cleavage strength in the range of 10 to 200 $N/cm^2$, 30 to 150 $N/cm^2$, or 50 to 100 $N/cm^2$. When the cleavage strength is in such a preferred range, both repeelability and adhesiveness can be easily satisfied.

The cleavage strength of the adhesive tape refers to a value measured by a method described later in Examples.

In the present disclosure, the adhesive tape may be produced by any method, which can be appropriately selected from known methods. A method for producing the adhesive tape according to the present disclosure may include an adhesive layer forming step, a substrate layer forming step, a stacking step, and optionally another layer forming step. The adhesive tape can also be produced by a simultaneous multilayer forming step of simultaneously performing the adhesive layer forming step and the substrate layer forming step.

The adhesive layer forming step may be any step of forming an adhesive layer and can be appropriately selected for each purpose. For example, the adhesive layer forming step is a method of forming an adhesive layer on a surface of a release sheet by a hot pressing method, an extrusion casting method, a uniaxial stretching method, a sequential biaxial stretching method, a simultaneous biaxial stretching method, an inflation method, a tube method, a calender method, a solution method, or the like. Among these, the extrusion casting method and the solution method are preferred.

The release sheet is not particularly limited and can be appropriately selected for each purpose. For example, the release sheet is paper, such as kraft paper, glassine paper, or high-quality paper; a resin film, such as polyethylene, polypropylene (biaxially oriented polypropylene (OPP) or uniaxially oriented polypropylene (CPP)), or poly(ethylene terephthalate) (PET); laminated paper composed of the paper and the resin film, or the paper filled with clay, poly(vinyl alcohol), or the like one or both surfaces of which are treated with a silicone resin or the like to be releasable. These may be used alone or in combination.

The substrate layer forming step may be any step of forming a substrate layer and can be appropriately selected for each purpose. For example, the substrate layer forming step is a hot pressing method, an extrusion casting method, a uniaxial stretching method, a sequential biaxial stretching method, a simultaneous biaxial stretching method, an inflation method, a tube method, a calender method, a solution method, or the like. These methods may be used alone or in combination. Among these, the extrusion casting method, the inflation method, the tube method, the calender method, and the solution method are preferred to impart suitable flexibility and stretchability to the substrate layer.

The substrate layer may be surface-treated to further improve adhesiveness to the adhesive layer.

The surface treatment method is not particularly limited and can be appropriately selected from known methods within the scope of not impairing the characteristics of the adhesive tape. For example, the surface treatment method is a sandblasting method, a surface polishing/rubbing method, a corona discharge treatment method, a chromic acid treatment method, a flame treatment method, a hot air treatment method, an ozone treatment method, an ultraviolet radiation treatment method, or an oxidation treatment method.

The stacking step is the step of stacking the substrate layer and the adhesive layer. The substrate layer and the adhesive layer may be stacked by any method, which can be appropriately selected from known methods and is, for example, a method of pressing and laminating the adhesive layer adhering to a release sheet formed in the adhesive layer forming step and the substrate layer.

An adhesive tape according to one or more embodiments of the present invention can be suitably used to fix or temporarily fix components in each industrial sector, such as fixing between sheet metals or between exterior components and housings, which constitute relatively large electronic equipment, such as flat-screen televisions, home appliances, and OA equipment, and fixing exterior components or rigid components, such as batteries, to relatively small electronic equipment, such as mobile electronic terminals, cameras, and personal computers, and can be suitably used for labels for displaying product information.

Although some embodiments of the present invention are described above, an adhesive tape according to one or more embodiments of the present invention is not limited to these embodiments and may be modified as appropriate.

EXAMPLES

Although one or more embodiments of the present invention are described in detail with the following examples, the scope of one or more embodiments of the present invention is not limited to these examples.

1. "Measurement and Evaluation of Adhesive Tape"

Adhesive tapes produced in Examples and Comparative Examples were measured and evaluated by the following methods.

(1) Measurement of Breaking Stress and Elongation at Break of Substrate Layer

The breaking stress and elongation at break of a substrate layer were measured by punching the substrate layer into a dumbbell with a gauge length of 20 mm and a width of 5 mm and pulling the substrate layer in a measurement atmosphere of 23° C. and 50% RH using a Tensilon tensile tester (model: RTF-1210, manufactured by A&D Company, Limited) at a crosshead speed of 500 mm/min in the longitudinal direction. Table 1 shows the results.

(2) Measurement of 50% Modulus of Substrate Layer

The stress at 50% elongation of a substrate layer was measured by punching the substrate layer into a dumbbell with a gauge length of 20 mm and a width of 5 mm and pulling the substrate layer in a measurement atmosphere of 23° C. and 50% RH using a Tensilon tensile tester (model: RTF-1210, manufactured by A&D Company, Limited) at a crosshead speed of 500 mm/min in the longitudinal direction.

(3) Measurement of Thickness of Substrate Layer and Adhesive Layer

A substrate layer and an adhesive layer were cut at 5 positions in the width direction at intervals of 100 mm in the longitudinal direction, and the thickness in each section was measured at 5 positions at intervals of 100 mm in the width direction using the TH-104 paper/film thickness meter (manufactured by Tester Sangyo Co., Ltd.). The thicknesses of the substrate layer and the adhesive layer were determined by averaging the thicknesses at the 25 positions in total.

(4) Measurement of Average Particle Size of Filler

The average particle size (primary particle size) of filler was measured with a measuring machine using the laser diffraction scattering method (Microtrac).

(5) Evaluation of 180-Degree Peel Adhesive Strength

The 180-degree peel adhesive strength was measured in accordance with JIS Z 0237. More specifically, each adhesive tape was cut into a length of 150 mm and a width of 20 mm, and one surface of the adhesive tape was lined with a PET film with a thickness of 25 µm. Next, the other surface of the adhesive tape was attached to a stainless steel plate (100 mm in length, 30 mm in width, and 3 mm in thickness) in an atmosphere of 23° C. and 50% RH. The layered structure of the adhesive tape and the stainless steel plate was pressure-bonded by reciprocating a roller once under a load of 2 kg, was then allowed to stand for 1 hour in an atmosphere of 23° C. and 50% RH, and was used as a test specimen. The 180-degree peel adhesive strength of the adhesive tape of the test specimen was measured by stretching the adhesive tape in an atmosphere of 23° C. and 50% RH in the 180-degree direction (horizontal direction) using a Tensilon tensile tester (model: RTF-1210, manufactured by A&D Company, Limited) at a crosshead speed of 300 mm/min.

(6) Evaluation of High-Load Holding Power

One surface of each adhesive tape cut into 25 mm in width and 25 mm in length was pressure-bonded at room temperature to a SUS304 steel plate 25 mm in width and 80 mm in length specified in JIS Z 0237 by reciprocating a 5-kg roller once at a speed of 300 mm/min, and was then allowed to stand at 23° C. for 30 minutes. The opposite surface of the test specimen was then pressure-bonded at room temperature to a SUS304 steel plate 25 mm in width and 80 mm in length specified in JIS Z 0237 by reciprocating a 5-kg roller once at a speed of 300 mm/min. The test specimen was then allowed to stand in an atmosphere of 40° C. for 30 minutes. A 5-kg weight was then attached to a grip of the test specimen and was hanged down to start the test. The time until the weight dropped was measured at 23° C. and 50% RH. With respect to high-load holding power, a dropping time of 120 minutes or more was judged to be acceptable (⊙), and a dropping time of less than 120 minutes was judged to be unacceptable (x).

(7) Evaluation of Repeelability

Repeelability was evaluated in two ways: a grip provided at one end portion of the adhesive tape in the longitudinal direction was pulled to stretch the adhesive tape at 90 degrees with respect to the longitudinal direction, during which the adhesive tape was allowed to stand for 1 minute (repeelability 1) or 30 minutes (repeelability 2). Details are described below.

(7-1) Repeelability 1 (Repeelability after being Allowed to Stand for 1 Minute in the Middle)

An adhesive tape 10 mm in width and 60 mm in total length was attached to a clean aluminum plate with a smooth surface. To use a portion of the adhesive tape 10 mm in width and 10 mm in length as a grip, the adhesive tape was attached such that the grip protruded from the aluminum plate. The opposite surface of the adhesive tape was then also attached to a clean acrylic plate with a smooth surface and was pressed by reciprocating a roller once under a load of 2 kg to prepare a test specimen. After bonding, the test specimen was allowed to stand in an atmosphere of 23° C. and 50% RH for 60 minutes, and the grip was stretched by hand at 23° C. and 50% RH at 90 degrees with respect to the longitudinal direction of the adhesive tape at a speed of approximately 300 mm/min. After peeling off 30 mm and standing for 1 minute, the grip was stretched again by hand at 90 degrees at a speed of approximately 300 mm/min.

The test was performed 10 times. Breakage of the adhesive tape and the residual adhesive agent level on the adherend after the adhesive tape was peeled off were visually evaluated according to the following criteria.

⊙: The adhesive tape was cleanly peeled off all the 10 times without breakage or residual adhesive agent.

○: Although the adhesive tape was peeled off without breakage all the 10 times, the adhesive agent remained once or more.

Δ: The adhesive tape was cleanly peeled off 6 to 9 times without breakage or residual adhesive agent.

x: The adhesive tape was broken 5 to 10 times, or the adhesive agent remained 5 to 10 times. Alternatively, the adhesive tape could not be stretched and peeled off.

(7-2) Repeelability 2 (Repeelability after being Allowed to Stand for 30 Minutes in the Middle)

An adhesive tape 10 mm in width and 60 mm in total length was attached to a clean aluminum plate with a smooth surface. To use a portion of the adhesive tape 10 mm in width and 10 mm in length as a grip, the adhesive tape was attached such that the grip protruded from the aluminum plate. The opposite surface of the adhesive tape was then also attached to a clean acrylic plate with a smooth surface and was pressed by reciprocating a roller once under a load of 2 kg to prepare a test specimen. After bonding, the test specimen was allowed to stand in an atmosphere of 23° C. and 50% RH for 60 minutes, and the grip was stretched by hand at 23° C. and 50% RH at 90 degrees with respect to the longitudinal direction of the adhesive tape at a speed of approximately 300 mm/min. After peeling off mm and standing for 30 minutes, the grip was stretched again by hand at 90 degrees at a speed of approximately 300 mm/min.

The test was performed 10 times. Breakage of the adhesive tape and the residual adhesive agent level on the adherend after the adhesive tape was peeled off were visually evaluated according to the following criteria.

Θ: The adhesive tape was cleanly peeled off all the 10 times without breakage or residual adhesive agent.

○: Although the adhesive tape was peeled off without breakage all the 10 times, the adhesive agent remained once or more.

Δ: The adhesive tape was cleanly peeled off 6 to 9 times without breakage or residual adhesive agent.

x: The adhesive tape was broken 5 to 10 times, or the adhesive agent remained 5 to 10 times. Alternatively, the adhesive tape could not be stretched and peeled off.

(8) Initial Cleavage Strength ($P_0$)

A double-sided adhesive tape cut into 30 mm×50 mm was used as a test specimen. A release liner on one surface of the test specimen was peeled off, and the surface was attached to a stainless steel (SUS) plate 3 mm in thickness. A release liner on the other surface was peeled off, and the surface was attached to a 10-mm square surface of a test specimen 10 mm×10 mm×40 mm in length. They were pressure-bonded at 50 N/cm$^2$ for 10 seconds to prepare a bonded material.

Immediately after the bonded material was attached in an atmosphere of 23° C. and 50% RH, the stainless steel piece of the test specimen constituting the bonded material was pulled at a speed of 1000 mm/min in an atmosphere of 23° C. and 50% RH to measure the strength at which the stainless steel piece peeled off.

(9) Cleavage Strength at 400% Elongation ($P_{400}$)

A double-sided adhesive tape cut into 30 mm×50 mm was used as a test specimen. Release liners on both surfaces of the test specimen were peeled off, and a grip was formed at each end of the test specimen. A strong adhesive double-sided tape to fix a stretched tape was attached to the surface of a stainless steel plate 2 mm in thick. The test specimen was stretched to a length of 400% and was attached to the double-sided adhesive tape on the surface of the stainless steel plate. A 10-mm square surface of a test specimen 10 mm×10 mm×40 mm in length was then attached to the other surface. They were pressure-bonded at 50 N/cm$^2$ for 10 seconds to prepare a bonded material.

Immediately after the bonded material was attached in an atmosphere of 23° C. and 50% RH, the stainless steel piece of the test specimen constituting the bonded material was pulled at a speed of 1000 mm/min in an atmosphere of 23° C. and 50% RH to measure the strength at which the stainless steel piece peeled off.

Materials used in Examples and Comparative Examples are described below.

2. "Material of Adhesive Tape"

(Substrate)

<Substrate (1): Styrene Substrate (1)>

A resin composition (1) of a styrene-ethylene butylene-styrene copolymer and a styrene-ethylene butylene copolymer was used as a substrate material used for a styrene substrate (1). In the resin composition (1), a styrene-derived structural unit represented by the chemical formula (A) constituted 29% by mass, and the styrene-ethylene butylene copolymer constituted 1% by mass of the total amount of the resin composition.

The resin composition (1) was used to prepare a substrate (1) with a thickness of 50 μm by hot pressing (pressure: 0.5 MPa, press plate temperature: 130° C., pressing time: 2 minutes). The substrate (1) had a breaking stress of 78 MPa. The elongation at break was 650%. The stress (modulus) at 50% elongation was 3 MPa.

<Substrate (2): Styrene Substrate (2)>

A resin composition (2) of a styrene-isoprene copolymer and a styrene-isoprene-styrene copolymer was used as a substrate material used for a styrene substrate (2). In the resin composition (2), a styrene-derived structural unit represented by the chemical formula (A) constituted 26% by mass, and the styrene-isoprene copolymer constituted 16% by mass of the total amount of the resin composition (2). The resin composition (2) was hot-pressed (pressure: 0.5 MPa, press plate temperature: 130° C., pressing time: 2 minutes) to prepare a substrate (2) with a thickness of 50 μm. The substrate (2) had a breaking stress of 11 MPa. The elongation at break was 1100%. The stress (modulus) at 50% elongation was 1 MPa.

<Substrate (3): PET Substrate (1)>

A polyester film "Lumirror S10 50 μm" manufactured by Toray Industries, Inc. was used as a PET substrate (1). The PET substrate (1) was used as a substrate (3). The PET substrate (1) had a breaking stress of 220 MPa. The elongation at break was 180%. The stress (modulus) at 50% elongation was 130 MPa.

(Adhesive Composition)

An adhesive composition to be used for an adhesive layer in one or more embodiments of the present invention contains the following filler and adhesive resin.

<Filler>

<<Silicone Particles (1)>>

Particles with a silicone resin surface and a silicone rubber interior (KMP-602 manufactured by Shin-Etsu Chemical Co., Ltd., volume-average particle size: 30 μm, particle size distribution ($D_{90}/D_{10}$): 5.2) were used as silicone particles (1).

<<Silicone Particles (2)>>

Particles with a silicone resin surface and a silicone rubber interior (KMP-600 manufactured by Shin-Etsu Chemical Co., Ltd., volume-average particle size: 5 μm, particle size distribution ($D_{90}/D_{10}$): 3.2) were used as silicone particles (2).

<<Acrylic Particles (1)>>

Poly(methyl methacrylate) particles (FH-S010 manufactured by Japan Exlan Co., Ltd., volume-average particle size: 10 μm, particle size distribution ($D_{90}/D_{10}$): 2.8) were used as acrylic particles (1).

<Adhesive Resin>

<<Synthesis of Block Copolymer>>

Synthesis Example 1

A mixed solution of 500 ml of dry toluene and 80 ml of a dry toluene solution of 0.75 g of a polymerization initiator bis(pentamethylcyclopentadienyl)samarium-tetrahydrofuranate complex [$(C_5Me_5)_2SmMe(THF)$] was prepared in a flask with an internal volume of 1000 ml purged with argon. 12.0 ml of methyl methacrylate (MMA) was added to the mixed solution at 0° C. and was stirred at 0° C. for 30 minutes. Then, 20 ml of solution was sampled from the system (sample 1). After polymerization of the MMA, the polymerization reaction system was cooled to −78° C., and 88.0 ml of n-butyl acrylate (nBA) was added as a second monomer. The mixture was stirred at −78° C. for 3 hours. Then, 20 ml of solution was sampled from the system (sample 2). After polymerization of the nBA, 12.0 ml of MMA was added to the polymerization system as a third monomer at −78° C., and the solution was stirred. After the solution became uniform, the solution was heated to 0° C. and was stirred for another 1 hour. 50 ml of methanol was added to the resulting reaction liquid mixture and was allowed to react at room temperature for 2 hours to stop the polymerization. The reaction solution after the termination of the polymerization was poured into a large amount of hexane. Thus, a white precipitate was formed. A portion of the white precipitate was sampled (sample 3).

Each polymer in the samples 1 to 3 was subjected to NMR measurement, DSC measurement, and GPC (gel permeation chromatography) measurement. The number-average molecular weight (Mn), the PMMA/PnBA (poly(methyl methacrylate) block/poly(n-butyl acrylate) block) ratio, and the like were determined on the basis of the measurement results. It was found that the white precipitate was a triblock copolymer of poly(methyl methacrylate) (PMMA) block-poly(n-butyl acrylate) (PnBA) block-poly(methyl methacrylate) (PMMA) block (PMMA-b-PnBA-b-PMMA). It was also found that the PMMA block of the triblock copolymer (PMMA-b-PnBA-b-PMMA, hereinafter referred to as an acrylic block copolymer (1)) had a syndiotacticity of 71% and a glass transition temperature of 113.7° C., the PnBA block had a glass transition temperature of −46.8° C., the total copolymer had a Mn of 95936 and a Mw/Mn (molecular weight distribution) of 1.09, and the ratio of each polymer block was PMMA (11% by mass)-PnBA (78% by mass)-PMMA (11% by mass).

Synthesis Example 2

A mixed solution of 500 ml of dry toluene and 80 ml of a dry toluene solution of 0.75 g of a polymerization initiator bis(pentamethylcyclopentadienyl)samarium-tetrahydrofuranate complex [$(C_5Me_5)_2SmMe(THF)$] was prepared in a flask with an internal volume of 1000 ml purged with argon. 6.0 ml of methyl methacrylate (MMA) was added to the mixed solution at 0° C. and was stirred at 0° C. for 30 minutes. Then, 20 ml of solution was sampled from the system (sample 4). After polymerization of the MMA, the polymerization reaction system was cooled to −78° C., and 27.2 ml of n-butyl acrylate (nBA) and 22.1 ml of 2-ethylhexyl acrylate (2EHA) were added as second monomers. The mixture was stirred at −78° C. for 3 hours. 20 ml of solution was sampled from the system (sample 5). After polymerization of the nBA, 6.0 ml of MMA was added to the polymerization system as a third monomer at −78° C., and the solution was stirred. After the solution became uniform, the solution was heated to 0° C. and was stirred for another 1 hour. 50 ml of methanol was added to the resulting reaction liquid mixture and was allowed to react at room temperature for 2 hours to stop the polymerization. The reaction solution after the termination of the polymerization was poured into a large amount of hexane. Thus, a white precipitate was formed. A portion of the white precipitate was sampled (sample 6).

Each polymer in the samples 4 to 6 was subjected to NMR measurement, DSC measurement, and GPC (gel permeation chromatography) measurement. The number-average molecular weight (Mn), the PMMA/PnBA/P2EHA (poly (methyl methacrylate)/poly(n-butyl acrylate)/poly(2-ethylhexyl acrylate)) ratio, and the like were determined on the basis of the measurement results. It was found that the white precipitate was a triblock copolymer of poly(methyl methacrylate) (PMMA) block-poly(n-butyl acrylate) (PnBA)/poly(2-ethylhexyl acrylate) (2EHA) block-poly(methyl methacrylate) (PMMA) block (PMMA-b-PnBA/2EHA-b-PMMA). It was also found that the PMMA block of the triblock copolymer (PMMA-b-PnBA/2EHA-b-PMMA, hereinafter referred to as an acrylic block copolymer (2)) had a syndiotacticity of 75% and a glass transition temperature of 105.8° C., the PnBA block had a glass transition temperature of −53.6° C., the total copolymer had a Mn of 51370 and a Mw/Mn (molecular weight distribution) of 1.15, and the ratio of each polymer block was PMMA (10% by mass)-PnBA (44% by mass)/2EHA (36% by mass)-PMMA (10% by mass).

<<Another Adhesive Resin>>

Synthesis Example 3

An acrylic random copolymer (1) produced by the following synthesis was used as an adhesive resin. An acrylic random copolymer (1) was produced by adding 97.97 parts by mass of n-butyl acrylate, 2 parts by mass of acrylic acid, and 0.03 parts by mass of 4-hydroxybutyl acrylate to ethyl acetate containing 0.2 parts by mass of a polymerization initiator azobisisobutyronitrile followed by solution polymerization at 77° C. for 8 hours. The Mw was 700,000, and the Mw/Mn (molecular weight distribution) was 4.7.

(SIS Rubber)

A SIS rubber (styrene triblock copolymer) (Quintac 3270 manufactured by Zeon Corporation, styrene content: 24%, SI diblock content: 67%) was used as an adhesive resin. The styrene triblock copolymer had a Mw of 175,000 and a Mw/Mn (molecular weight distribution) of 1.05. The diblock copolymer had a Mw of 84,000 and a Mw/Mn (molecular weight distribution) of 1.05.

<Preparation of Adhesive Resin Composition>

Adhesive Composition (1)

100 parts by mass of the acrylic block copolymer (1) prepared in Synthesis Example 1 was mixed and stirred with 50 parts by mass of a terpene phenolic tackifier resin (Tamanol T-803L, Arakawa Chemical Industries, Ltd., softening point: 150° C.), and ethyl acetate was then added to the mixture to prepare an adhesive resin solution (1) with a solid content of 35% by mass. Next, 100 parts by mass of the solid content of the adhesive resin solution (1) was mixed uniformly by stirring with 38 parts by mass of the silicone particles (1) and ethyl acetate to prepare an adhesive composition (1) with a solid content of 40% by mass.

Adhesive Composition (2)

100 parts by mass of the acrylic block copolymer (1) prepared in Synthesis Example 1 was mixed and stirred with 50 parts by mass of a terpene phenolic tackifier resin (YS Polyster T130, Yasuhara Chemical Co., Ltd., softening point: 130° C.), and ethyl acetate was then added to the mixture to prepare an adhesive resin solution (2) with a solid content of 35% by mass. Next, 100 parts by mass of the solid content of the adhesive resin solution (2) was mixed uniformly by stirring with 38 parts by mass of the silicone particles (1) and ethyl acetate to prepare an adhesive composition (2) with a solid content of 40% by mass.

Adhesive Composition (3)

100 parts by mass of the acrylic block copolymer (1) prepared in Synthesis Example 1 was mixed and stirred with 50 parts by mass of a terpene phenolic tackifier resin (YS Polyster T130, Yasuhara Chemical Co., Ltd., softening point: 130° C.), and ethyl acetate was then added to the mixture to prepare an adhesive resin solution (3) with a solid content of 35% by mass. Next, 100 parts by mass of the solid content of the adhesive resin solution (3) was mixed uniformly by stirring with 38 parts by mass of the silicone particles (2) and ethyl acetate to prepare an adhesive composition (3) with a solid content of 40% by mass.

Adhesive Composition (4)

100 parts by mass of the acrylic block copolymer (2) prepared in Synthesis Example 2 was mixed and stirred with 50 parts by mass of a terpene phenolic tackifier resin (YS Polyster T130, Yasuhara Chemical Co., Ltd., softening point: 130° C.), and ethyl acetate was then added to the mixture to prepare an adhesive resin solution (4) with a solid content of 35% by mass. Next, 100 parts by mass of the solid content of the adhesive resin solution (4) was mixed uniformly by stirring with 38 parts by mass of the silicone particles (1) and ethyl acetate to prepare an adhesive composition (4) with a solid content of 40% by mass.

Adhesive Composition (5)

100 parts by mass of the acrylic block copolymer (1) prepared in Synthesis Example 1 was mixed and stirred with 50 parts by mass of a terpene phenolic tackifier resin (YS Polyster T130, Yasuhara Chemical Co., Ltd., softening point: 130° C.), and ethyl acetate was then added to the mixture to prepare an adhesive resin solution (5) with a solid content of 35% by mass. Next, 100 parts by mass of the solid content of the adhesive resin solution (5) was mixed uniformly by stirring with 38 parts by mass of the acrylic particles (1) and ethyl acetate to prepare an adhesive composition (5) with a solid content of 40% by mass.

Adhesive Composition (6)

100 parts by mass of the acrylic block copolymer (1) prepared in Synthesis Example 1 was mixed and stirred with 50 parts by mass of a terpene phenolic tackifier resin (YS Polyster T130, Yasuhara Chemical Co., Ltd., softening point: 130° C.), and ethyl acetate was then added to the mixture to prepare an adhesive resin solution (6) with a solid content of 35% by mass. Next, 100 parts by mass of the solid content of the adhesive resin solution (4) was mixed uniformly by stirring with 70 parts by mass of the silicone particles (1) and ethyl acetate to prepare an adhesive composition (6) with a solid content of 40% by mass.

Adhesive Composition (7)

100 parts by mass of a styrene triblock copolymer (Quintac 3270 manufactured by Zeon Corporation, styrene content: 24%, SI diblock content: 67%) was mixed and stirred with 50 parts by mass of a rosin tackifier resin (Super Ester A-100, Arakawa Chemical Industries, Ltd., softening point: 100° C.), and toluene was then added to the mixture to prepare an adhesive resin solution (7) with a solid content of 35% by mass as an adhesive resin. 100 parts by mass of the solid content of the adhesive resin solution (7) was mixed uniformly by stirring with 38 parts by mass of the silicone particles (1) and toluene to prepare an adhesive composition (7) with a solid content of 40% by mass.

Adhesive Composition (8)

100 parts by mass of the acrylic random copolymer prepared in Synthesis Example 3 was mixed and stirred with 5 parts by mass of a rosin tackifier resin (Haritack PCJ, Harima Chemicals Group, Inc., softening point: 135° C.) and 45 parts by mass of a petroleum tackifier resin (FTR6125, Mitsui Chemicals, Inc., softening point: 125° C.), and ethyl acetate was added to the mixture to prepare an adhesive resin solution (8) with a solid content of 35% by mass. Next, 100 parts by mass of the solid content of the adhesive resin solution (8) was mixed uniformly by stirring with 38 parts by mass of the silicone particles (1) and ethyl acetate to prepare an adhesive composition (8) with a solid content of 40% by mass.

3. "Production of Adhesive Tape"

Example 1

The adhesive composition (1) was applied with an applicator to a release liner (Filmbyna 75E-0010GT manufactured by Fujimori Kogyo Co., Ltd., the same applies to the following) such that the thickness after drying was 50 μm, and was dried at 80° C. for 3 minutes to form an adhesive layer. Next, both surfaces of the substrate (1) were corona-treated as a substrate layer such that the wetting tension was 52 mN/m, and were then bonded to the adhesive layer. The layered structure of the substrate layer and the adhesive layer was pressed at 0.2 MPa to produce an adhesive tape of Example 1. The adhesive tape was evaluated by the methods described above, and the results are shown in Table 1.

Example 2

An adhesive tape of Example 2 was produced in the same manner as in Example 1 except that the adhesive composition (1) in the production of the adhesive tape of Example 1 was changed to the adhesive composition (2). The adhesive tape was evaluated by the methods described above, and the results are shown in Table 1.

Example 3

An adhesive tape of Example 3 was produced in the same manner as in Example 1 except that the adhesive composition (1) in the production of the adhesive tape of Example 1 was changed to the adhesive composition (3). The adhesive tape was evaluated by the methods described above, and the results are shown in Table 1.

Example 4

An adhesive tape of Example 4 was produced in the same manner as in Example 1 except that the adhesive composition (1) in the production of the adhesive tape of Example 1 was changed to the adhesive composition (4). The adhesive tape was evaluated by the methods described above, and the results are shown in Table 1.

Example 5

An adhesive tape of Example 5 was produced in the same manner as in Example 1 except that the adhesive composition (1) in the production of the adhesive tape of Example 1 was changed to the adhesive composition (5). The adhesive tape was evaluated by the methods described above, and the results are shown in Table 1.

Example 6

An adhesive tape of Example 6 was produced in the same manner as in Example 1 except that the adhesive composition (1) in the production of the adhesive tape of Example 1 was changed to the adhesive composition (6). The adhesive tape was evaluated by the methods described above, and the results are shown in Table 1.

Example 7

An adhesive tape of Example 7 was produced in the same manner as in Example 1 except that the adhesive composition (1) in the production of the adhesive tape of Example 1 was changed to the adhesive composition (7). The adhesive tape was evaluated by the methods described above, and the results are shown in Table 1.

Example 8

An adhesive tape of Example 8 was produced in the same manner as in Example 1 except that the substrate (1) in the production of the adhesive tape of Example 1 was changed to the substrate (2). The adhesive tape was evaluated by the methods described above, and the results are shown in Table 1.

Comparative Example 1

An adhesive tape of Comparative Example 1 was produced in the same manner as in Example 1 except that the adhesive composition (1) in the production of the adhesive tape of Example 1 was changed to the adhesive composition (8). The adhesive tape was evaluated by the methods described above, and the results are shown in Table 2.

Comparative Example 2

An adhesive tape of Comparative Example 2 was produced in the same manner as in Example 1 except that the substrate (1) in the production of the adhesive tape of Example 1 was changed to the substrate (3). The adhesive tape was evaluated by the methods described above, and the results are shown in Table 2. In Comparative Example 2, the PET substrate was broken before being stretched by 400%, and $P_{400}$ could not be calculated.

TABLE 1

| | | Example 1 | Example 2 | Example 3 | Example 4 | Example 5 | Example 6 | Example 7 | Example 8 |
|---|---|---|---|---|---|---|---|---|---|
| Substrate layer | Type of substrate layer | Styrene substrate (1) | Styrene substrate (1) | Styrene substrate (1) | Styrene substrate (1) | Styrene substrate (1) | Styrene substrate (1) | Styrene substrate (1) | Styrene substrate (2) |
| | Breaking stress (MPa) | 78 | 78 | 78 | 78 | 78 | 78 | 78 | 11 |
| | Elongation at break (%) | 650 | 650 | 650 | 650 | 650 | 650 | 650 | 1100 |

TABLE 1-continued

| | | Example 1 | Example 2 | Example 3 | Example 4 | Example 5 | Example 6 | Example 7 | Example 8 |
|---|---|---|---|---|---|---|---|---|---|
| Adhesive layer | Type of adhesive resin | Acrylic block copolymer (1) | Acrylic block copolymer (1) | Acrylic block copolymer (1) | Acrylic block copolymer (2) | Acrylic block copolymer (1) | Acrylic block copolymer (1) | Styrene triblock copolymer | Acrylic block copolymer (1) |
| | Type of filler | Silicone particles (1) | Silicone particles (1) | Silicone particles (2) | Silicone particles (1) | Acrylic particles (1) | Silicone particles (1) | Silicone particles (1) | Silicone particles (1) |
| | Storage modulus G' (23° C.)(Pa) | $3 \times 10^5$ | $1.1 \times 10^5$ | $1.0 \times 10^5$ | $1.5 \times 10^5$ | $5.3 \times 10^5$ | $1.5 \times 10^5$ | $7.3 \times 10^5$ | $3 \times 10^5$ |
| $P_0$ | [N/cm$^2$] | 100 | 110 | 93 | 51 | 60 | 55 | 82 | 100 |
| $P_{400}$ | [N/cm$^2$] | 12 | 10 | 39 | 21 | 21 | 3 | 33 | 10 |
| $P_{400}/P_0$ | | 0.12 | 0.09 | 0.42 | 0.41 | 0.35 | 0.05 | 0.40 | 0.10 |
| Evaluation of repeelability | Repeelability 1 (interruption for 1 min.) | ⊙ | ⊙ | ⊙ | ⊙ | ⊙ | ⊙ | ⊙ | ⊙ |
| | Repeelability 2 (interruption for 30 min.) | ⊙ | ⊙ | ○ | ○ | ○ | ⊙ | ○ | ⊙ |
| High-load holding power | Initial | ⊙ | ⊙ | ⊙ | ⊙ | ⊙ | ⊙ | ⊙ | ⊙ |
| Peel adhesive strength (N/20mm) | | 13 | 10 | 16 | 15 | 6 | 11 | 24 | 12 |

TABLE 2

| | | Comparative example 1 | Comparative example 2 |
|---|---|---|---|
| Substrate layer | Type of substrate layer | Styrene substrate (1) | PET substrate (1) |
| | Breaking stress (MPa) | 78 | 220 |
| | Elongation at break (%) | 650 | 180 |
| Adhesive layer | Type of adhesive resin | Acrylic random copolymer (1) | Acrylic block copolymer (1) |
| | Type of filler | Silicone particles (1) | Silicone particles (1) |
| | Storage modulus G' (23° C.)(Pa) | $9 \times 10^4$ | $3 \times 10^5$ |
| $P_0$ | [N/cm$^2$] | 48 | 110 |
| $P_{400}$ | [N/cm$^2$] | 47 | — |
| $P_{400}/P_0$ | | 0.98 | — |
| Evaluation of repeelability | Repeelability 1 (interruption for 1 min.) | X | X |
| | Repeelability 2 (interruption for 30 min.) | X | X |
| High-load holding power | Initial | ◎ | ◎ |
| Peel adhesive strength (N/20 mm) | | 14 | 12 |

Although the disclosure has been described with respect to only a limited number of embodiments, those skilled in the art, having benefit of this disclosure, will appreciate that various other embodiments may be devised without departing from the scope of the present disclosure. Accordingly, the scope of the invention should be limited only by the attached claims.

What is claimed is:

1. An adhesive tape comprising:

a substrate layer; and an adhesive layer, wherein:

the substrate layer has a breaking stress in a range of 1 to 100 MPa and an elongation at break in a range of 400% to 3000%, the following relational expression (i) is satisfied:

[Math. 1]

$$P_{400}/P_0 \leq 0.9 \quad \text{(i), and}$$

$P_0$ denotes an initial cleavage strength N/cm$^2$ of the adhesive tape, and $P_{400}$ denotes a cleavage strength N/cm$^2$ when the adhesive tape is stretched by 400%, and the adhesive layer has a storage modulus G' in a range of $2.0\times10^5$ to $1.0\times10^7$ Pa at 23° C.

2. The adhesive tape according to claim 1, wherein the adhesive layer contains filler.

3. The adhesive tape according to claim 2, wherein the filler is a silicone resin.

4. The adhesive tape according to claim 1, wherein the adhesive layer contains a styrene block copolymer.

5. The adhesive tape according to claim 1, wherein the adhesive layer contains a triblock copolymer with a repeating unit represented by

[Chem. 1]

$$*-(A)_p-(B)_q-(C)_r-* \quad (1)$$

wherein A, B, and C independently denote a repeating unit,

A and C independently denote an alkyl methacrylate monomer unit,

B denotes an alkyl acrylate monomer unit, p, q, and r independently denote a degree of polymerization of monomer units respectively, A and C are the same or denote an alkyl methacrylate monomer unit with a different chemical structure, and

* denotes a bonding arm to another atom.

6. The adhesive tape according to claim 1, wherein the adhesive layer further contains a tackifier resin.

* * * * *